United States Patent
Legrand et al.

(10) Patent No.: US 9,582,536 B2
(45) Date of Patent: *Feb. 28, 2017

(54) LONG-TERM VALIDITY OF PRE-COMPUTED REQUEST RESULTS

(71) Applicant: Amadeus S.A.S., Sophia Antipolis (FR)

(72) Inventors: Guillaume Legrand, Waltham, MA (US); Damien Ciabrini, Mouans-Sartoux (FR)

(73) Assignee: AMADEUS S.A.S., Biot (FR)

( * ) Notice: Subject to any disclaimer, the term of this patent is extended or adjusted under 35 U.S.C. 154(b) by 103 days.

This patent is subject to a terminal disclaimer.

(21) Appl. No.: 14/183,911

(22) Filed: Feb. 19, 2014

(65) Prior Publication Data

US 2015/0234890 A1 Aug. 20, 2015

(51) Int. Cl.
*G06F 17/30* (2006.01)
*H04L 29/08* (2006.01)

(52) U.S. Cl.
CPC ......... *G06F 17/30424* (2013.01); *H04L 67/10* (2013.01)

(58) Field of Classification Search
CPC .................. G06F 17/30424; G06F 17/30457; G06F 17/3048; H04L 67/10
See application file for complete search history.

(56) References Cited

U.S. PATENT DOCUMENTS

| 6,763,362 B2 * | 7/2004 | McKeeth .......... G06F 17/30864 |
| 7,562,027 B1 | 7/2009 | Baggett et al. |
| 8,037,042 B2 | 10/2011 | Anderson et al. |

(Continued)

FOREIGN PATENT DOCUMENTS

| EP | 2249261 A1 | 11/2010 |
| EP | 2541473 A1 | 6/2011 |

(Continued)

OTHER PUBLICATIONS

European Patent Office, search report issued in application No. 14290040.6 dated May 30, 2014.

(Continued)

*Primary Examiner* — Shiow-Jy Fan
(74) *Attorney, Agent, or Firm* — Thompson Hine LLP

(57) ABSTRACT

Methods, systems, and computer program products for maintaining up-to-date pre-computed search results, such as travel recommendations, stored in a data cache maintained, for example, by a global distribution system. Pre-computed search results are re-computed to provide long-term accuracy. A re-computation controller assigns a re-computation indicator to any of the pre-computed search results. The re-computation indicator for a pre-computed search result is based on at least on a probability that the pre-computed search result is still valid, and on a re-computation frequency of the search result. Within a given time interval, a computation platform re-computes these pre-computed search results having a re-computation indicator indicating the highest need for re-computation. The number of pre-computed search results re-computed by the computation platform is limited by the computation resources of the computation platform that are available for the re-computation within the given time interval.

20 Claims, 11 Drawing Sheets

(56) References Cited

U.S. PATENT DOCUMENTS

| | | | |
|---|---|---|---|
| 8,082,247 B2 | 12/2011 | Kumthekar et al. | |
| 8,615,512 B2 | 12/2013 | Wexler et al. | |
| 8,706,716 B2 | 4/2014 | Kuznetsov et al. | |
| 8,832,088 B1 | 9/2014 | Chen et al. | |
| 8,898,153 B1 | 11/2014 | Kim et al. | |
| 8,943,043 B2* | 1/2015 | Lymberopoulos | G06F 17/30902 707/721 |
| 9,009,146 B1 | 4/2015 | Lopatenko et al. | |
| 9,128,988 B2 | 9/2015 | Cheng et al. | |
| 2003/0200194 A1* | 10/2003 | Arnold | G06F 17/3048 |
| 2004/0128346 A1* | 7/2004 | Melamed | G06F 17/30902 709/203 |
| 2005/0234971 A1 | 10/2005 | Folkert et al. | |
| 2007/0094254 A1 | 4/2007 | Cutts et al. | |
| 2008/0167973 A1* | 7/2008 | De Marcken | G06F 17/30902 705/5 |
| 2008/0262878 A1 | 10/2008 | Webby et al. | |
| 2009/0204753 A1 | 8/2009 | Bridge, Jr. et al. | |
| 2011/0055202 A1* | 3/2011 | Heimendinger | G06F 17/30424 707/721 |
| 2011/0295844 A1 | 12/2011 | Sun et al. | |
| 2012/0330693 A1* | 12/2012 | Ciabrini | G06Q 50/14 705/5 |
| 2013/0024404 A1 | 1/2013 | Zacharia et al. | |
| 2013/0073586 A1* | 3/2013 | Aubry | G06F 17/30477 707/769 |
| 2014/0052750 A1 | 2/2014 | Ciabrini et al. | |
| 2014/0149399 A1 | 5/2014 | Kurzion | |
| 2014/0280293 A1 | 9/2014 | Scanlon | |
| 2014/0310232 A1 | 10/2014 | Plattner et al. | |
| 2015/0227631 A1 | 8/2015 | Legrand et al. | |

FOREIGN PATENT DOCUMENTS

| | | |
|---|---|---|
| WO | 9922315 A1 | 5/1999 |
| WO | 2013160721 A1 | 10/2013 |
| WO | 2014026753 A1 | 2/2014 |

OTHER PUBLICATIONS

Choo et al, "Synchronizing a Database to Improve Freshness" Proceedings of the 2000 ACM Sigmod International Conference on Management of Data, vol. 29, No. 2, Jun. 1, 2000, pp. 117-128.

Carney et al., "Scalable Application-aware Data Freshening", Proceedings of the 19th International Conference on Data Engineering, Mar. 5, 2003, pp. 481-492.

Sundaresan, et al., "Slacker Coherence Protocol for Pull-based Monitoring of On-line Data Sources", Proceedings of the International Symposium on Cluster Computing and the Grid, May 12, 2003, pp. 250-257.

Lehner et al., "Fast Refresh Using Mass Query Optimization", Proceedings of the International Conference on Data Engineering, Apr. 2, 2001, pp. 391-398.

Vu et al., "On Scheduling Data Loading and View Maintenance in Soft Real-time Data Warehouses", 15th International Conference on Management of Data Comad, Dec. 12, 2009.

USPTO, Office Action issued in U.S. Appl. No. 14/179,815 dated Aug. 30, 2016.

European Patent Office, Official Action issued in Application No. 14 290 034.9 dated Jun. 27, 2016.

USPTO, final Office Action issued in U.S. Appl. No. 14/179,815 dated May 12, 2016.

USPTO, Office Action issued in U.S. Appl. No. 14/179,815 dated Nov. 4, 2015.

Michael Frasca et al., "Can models of scientific software-hardware interactions be predictive?" Procedia Computer Science, vol. 4, May 14, 2011, pp. 322-331.

Baldi, et al. "Modeling the Internet and the Web: Probabilistic Methods and Algorithms" in Modeling the Internet and the Web: Probabilistic Methods and Algorithms, Jan. 1, 2003, Wiley, ISBN: 978-0-47-084906-4 pp. 161-167.

European Patent Office, European Search Report issued in application No. 14290034.9 dated Jun. 6, 2014.

Rob Lancaster, "Survival Analysis & TTL Optimization", O'Reilley Conferences, Feb. 28, 2012, Santa Clara, CA.

* cited by examiner

LONG-TERM VALIDITY OF PRE-COMPUTED REQUEST RESULTS

BACKGROUND

The invention generally relates to computers and computer software and, in particular, to methods, systems, and computer program products for maintaining up-to-date pre-computed search results, such as travel recommendations, stored as cached data, such as the data cache maintained by a global distribution system.

Travel agents and travelers may use computer-based devices to interface with a travel reservation system, such as a global distribution system (GDS), to shop for travel recommendations in connection with a trip. When interacting with the travel reservation system, the travel agent or traveler may initiate a session between a client device and the travel reservation system to shop for travel recommendations and to eventually book one or more travel inventory items (e.g., flights and hotel rooms).

The session between a client device and the travel reservation system typically includes a request for which the response requires a database query. Large volumes of data must be processed to provide a short response time to these database queries. For example, such computing-power intensive processing must be performed in response to open queries that contain only little input information (e.g., only one or two parameters out of a dozen possible parameters are specified and/or the specified value ranges of the parameters are broad) and, consequently, generally lead to a large number of results (e.g., travel recommendations). Possibilities to speed up data processing by increasing hardware performance are limited.

Query times may be shortened by pre-computing expected queries and maintaining the results corresponding to each expected query in a cache system. Arriving queries are directed to the cache system instead of being processed on the large database. However, caching approaches may not be able to maintain up-to-date pre-computed search results in order to ensure that the cached results correctly reflect the status of the corresponding large database. If the underlying data changes in the database, the cached query results may become outdated and the cache system may return incorrect results.

Improved methods, systems, and computer program products are needed to maintain up-to-date pre-computed search results, such as travel recommendations, stored in a data cache, such as the data cache maintained by a global distribution system.

SUMMARY

According to one embodiment, a method is provided for re-computing pre-computed search results performed in a database environment. The database environment is at least composed of at least one search platform maintaining pre-computed search results, a re-computation controller and a computation platform. Long-term accuracy of the pre-computed search results is provided by the following activities. The re-computation controller assigns a re-computation indicator to any of the pre-computed search results. The re-computation indicator for a pre-computed search result i is based on at least the following factors: a probability that the pre-computed search result i is still valid; and a re-computation frequency of the search result i. The computation platform re-computes pre-computed search results having a re-computation indicator indicating the highest need for re-computation. The number of pre-computed search results re-computed by the computation platform is limited by the computation platform's computation resources available for the re-computation within the given time interval.

According to another embodiment, a re-computation controller is provided for employment in a database environment that includes a search platform maintaining pre-computed search results and a computation platform. The re-computation controller provides long-term accuracy of the pre-computed search results by being arranged to assign a re-computation indicator to any of the pre-computed search results, wherein the re-computation indicator for a pre-computed search result i is based on at least the following factors: a probability that the pre-computed search result i is still valid; and a re-computation frequency of the search result i. The re-computation controller is further arranged to generate re-computation orders for pre-computed search results having a re-computation indicator indicating the highest need for re-computation. The number of pre-computed search results re-computed by the computation platform being limited by the computation platform's computation resources available for the re-computation. The re-computation controller is further arranged to transmit the re-computation orders to the computation platform in order to make the computation platform re-compute the pre-computed search results indicated by the re-computation orders.

According to a still further embodiment, a non-transitory computer readable storage medium is provided which as computer program instructions stored therein, which when executed on a computer system cause the computer system to perform these activities.

According to another embodiment, the computation resources to re-compute pre-computed search result i depend on whether or not other pre-computed search results related to the pre-computed search result i are re-computed during the given time interval and the computation resources needed to re-compute pre-computed search result i are dynamically estimated depending on which other pre-computed search results related to the pre-computed search result i are selected for re-computation during the given time interval.

According to a further embodiment, the pre-computed search results for re-computation by the computation platform within the given time interval are iteratively selected. This iterative selection includes an estimating of the re-computation resources to re-compute the pre-computed search results, which in turn comprises initializing the computation resources $c_i$ needed to re-compute each pre-computed search result i with a value assuming computation of i independent from the computation of other pre-computed search results selected for re-computation during the given time interval. The estimation of the re-computation resources further includes selecting a portion of the pre-computed search results for re-computation in accordance with the re-computation indicator, wherein, based on the current values for the computation resources needed to re-compute the portion of pre-computed search results, the selected portion only requiring a given percentage of the computation platform's overall computation resources available for re-computation within the given time interval. The estimation of the re-computation resources further includes re-assessing the computation resources $c_i$ needed to re-compute each pre-computed search result i by taking into account which pre-computed search results related to the pre-computed search result i have been selected for re-computation, and proceeding with the selection of the portion of the pre-computed search results for re-computation in accordance with the re-computation indicator if less than 100% of the computation platform's overall computation resources available for re-computation within the given time interval is exhausted.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

In order to be able to handle database queries or batch computation requests that require computations on the basis of large volumes of underlying data, search results corresponding to expected queries are generally pre-computed and stored as database records in a database. This database is queried by requesting entities (such as clients, applications, browsers installed on user terminals, etc.) in the course of a search. In response to the query, pre-computed search results fulfilling search criteria indicated by the query are returned to the client. Subsequently, the term "query" is used as a general term including any type of information retrieval requests, such as transactional queries, requests for batch computations, etc.

Figure 1:
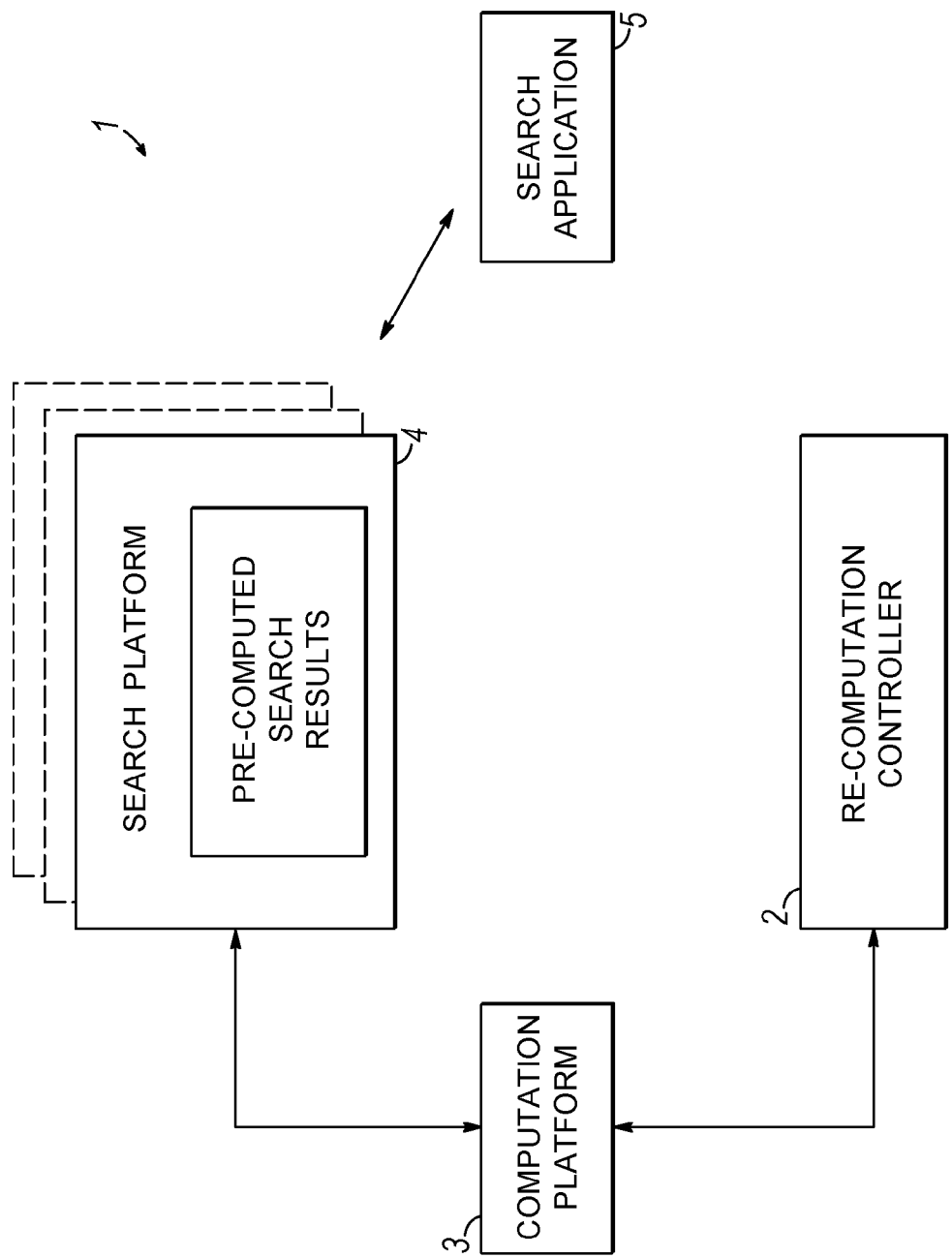
FIG. 1 schematically shows a distributed database environment.

FIG. 1 illustrates such a database environment 1 on an abstract level. Basic data, hereinafter also referred to as "calculation data", is kept in and/or accessed by a computation platform 3 that is connected to a re-computation controller 2. The re-computation controller 2 issues re-computation orders to the computation platform 3, which, in turn, transmits the corresponding results to the search platform 4 and, in addition, to the re-computation controller 2 that also maintains the pre-computed search results for reasons of re-computation control. End users 5, such as applications on user terminals, access the pre-computed search results from the search platform 4.

As indicated by FIG. 1, one or more search platforms 4 may be present in environment 1. If multiple search platforms 4 are present, the pre-computed search results may be maintained in a distributed manner over the several search platforms 4 and re-computation controller 2 may control the re-computation of all pre-computed search results distributed over these search platforms 4. The search platform 4 may also offer a heterogeneous set of pre-computed search requests, e.g., some search platforms 4 maintain pre-computed search requests relating to air travel, other search platforms 4 stored pre-computed search request related to insurances, and other search platforms 4 keep pre-computed (or pre-crawled) search requests related to Internet websites. Such a heterogeneous environment may be controlled by one single re-computation controller 2 or by multiple re-computation controllers 2. Alternatively, the search platforms 4 may be utilized to mirror the same pre-computed search results, for example, for reasons of redundancy.

The approach of pre-computing search results and storing them in the search platform accessible to querying clients leads to the general situation that the calculation data may change over time and, thus, the pre-computed search results get outdated or invalid (both terms are used synonymously herein). Pre-computed search results that are still up-to-date, i.e., which match the corresponding real-time computation equivalents (results which would be actually computed on demand without having pre-computed search results available), are called "accurate" pre-computed search results hereinafter. Thus, when the search platform maintaining the pre-computed search results correctly represents the current state of the data domain underlying the cached query results (i.e., the calculation data), the pre-computed search results stored in the search platform are, in general, accurate.

Generally, to enable the search platform to return correct results, a high degree of correlation should be maintained between pre-computed search results that are provided to the querying entity in response to database queries and their real-time computation equivalents. At the same time, however, it is desirable to minimize computation resource consumption caused by re-computations (i.e., to avoid any unnecessary re-computations such as re-computation of still accurate cached query results). Computing resources are limited and, generally, computing resources are insufficient to re-compute all pre-computed search results at all times. Thus, a trade-off is found between pre-computed search results accuracy and utilization of the available computing power.

In order to increase the efficiency of re-computation, metrics are defined to evaluate the necessity of each re-computation. For instance, it may not be worth reshooting an entire massive pre-computation every day if less than half of the computed query results turn out to be outdated. On the other hand, if particular classes of query results are known to change frequently, re-computing these particular classes several times per day might be beneficial for the accuracy. Consequently, an effective way of assessing or estimating search result accuracy is needed that generally takes into account both the associated gain on accuracy and the cost of re-computation.

According to the search results update strategy presented herein, re-computations of pre-computed search results are decided based on a predictive model that yields estimations of the accuracy of the pre-computed search results kept in the search platform. This predictive model models the discrepancies between the pre-computed search results and presumed actual search results, i.e., the predictive model approximates the accuracy or inaccuracy of any pre-computed search result. The predictive model models, for example, the probable validity of the pre-computed search results over time. Presumptions on validity of the pre-computed results are concluded and extrapolated from past real-world experiences on the subject matter of the respective data domain.

For example, the underlying calculation data may belong to the domain of air travel and contain information on flights, such as departure and destination airport, airline, departure and return dates, fares, booking classes, and the like. This air-travel related data is maintained in the computation platform and is queried by customers in order to receive knowledge of, for example, availability and prices of air flights or any other priced travel products/services. Computing, for example, prices based on the basic flight data is resource-consuming and time-consuming. Hence, the actual prices may be pre-computed and stored in the search platform. In this example, the probabilistic model models the validity of the travel recommendation prices over time. The required knowledge to build such a model can be taken from real-world experiences on the behavior and development of, for example, travel recommendation prices prior to the departure date. For example, it might be known that prices remain relatively stable over the time period prior to one month before the respective departure dates, but get more volatile during the month before the departure date. Hence, the probabilistic model indicates that pre-computed prices belonging to travel recommendations upcoming in the next month should be re-computed more often than such pre-computed prices that are associated with recommendations in the more distant future.

A particular strategy for re-computing pre-computed search results based on a predictive model is, for example, proposed by the unpublished International patent application PCT/EP2013/002390, which is hereby incorporated by reference herein in its entirety. In particular, approaches disclosed therein take into account the so-called "volatility" and "popularity" of the pre-computed search results. Note that this "volatility" does not refer to a change of the pre-computed search results themselves, but to a change of the underlying data forming the basis for calculation of the pre-computed search results, potentially resulting in outdated or invalid pre-computed search results. "Popularity" relates to the frequency of queries to the pre-computed search results in the database: pre-computed search results queried more often than others are more popular than these other more non-popular pre-computed search results.

Concentrating the re-computation strategy solely on volatile and popular pre-computed search results (i.e., such pre-computed search results which are regularly outdated by change of their corresponding underlying calculation data) is not an optimum approach. This strategy only yields short-term increases of the pre-computed search results' accuracy, but might cause accuracy degradation in the long run. This is now described in greater detail before then turning on the consequences of these recognitions drawn by the embodiments of the invention.

To understand the drawbacks of a re-computation strategy particularly focusing solely on volatility and popularity of pre-computed search results, the parameters of age and validity rate for a pre-computed search result i are defined.

The age $t_i$ of the pre-computed search result i is the time since the last computation of this pre-computed search result by the computation platform 3.

The validity rate $\lambda_i$ of the pre-collected search result i is a measure of how long the pre-collected search result i remains valid or how fast the pre-collected search result i becomes invalid due to changes of the underlying original data. This validity rate of a given pre-computed search result i may be, for example, statistically derived from the occurrence and the outcomes of past (re-)computations or (re-)collections and comparisons of the re-collected search result with its previous state or values. For example, it has been determined that a particular pre-collected search result i has a validity rate $\lambda_i$ of 10% per hour meaning that the probability of a particular pre-collected search result i being valid decreases by 10% every hour. At the time of its (re-)collection or (re-)computation, a particular pre-collected search result i is generally 100% valid. After one hour, a particular pre-collected search result i is valid with a probability of 90%. After two hours, the validity of a particular pre-collected search result i is 81% (=90% decreased by another 10%). After three hours, the validity of a particular pre-collected search result i is 72.9%, and so on.

The validity rate $\lambda_i$ may be employed to provide an estimate of the probability for a pre-computed search result to stay valid after a given time:

$$P(\text{unchanged after } t) = e^{-\lambda_i t}.$$

Figure 2:
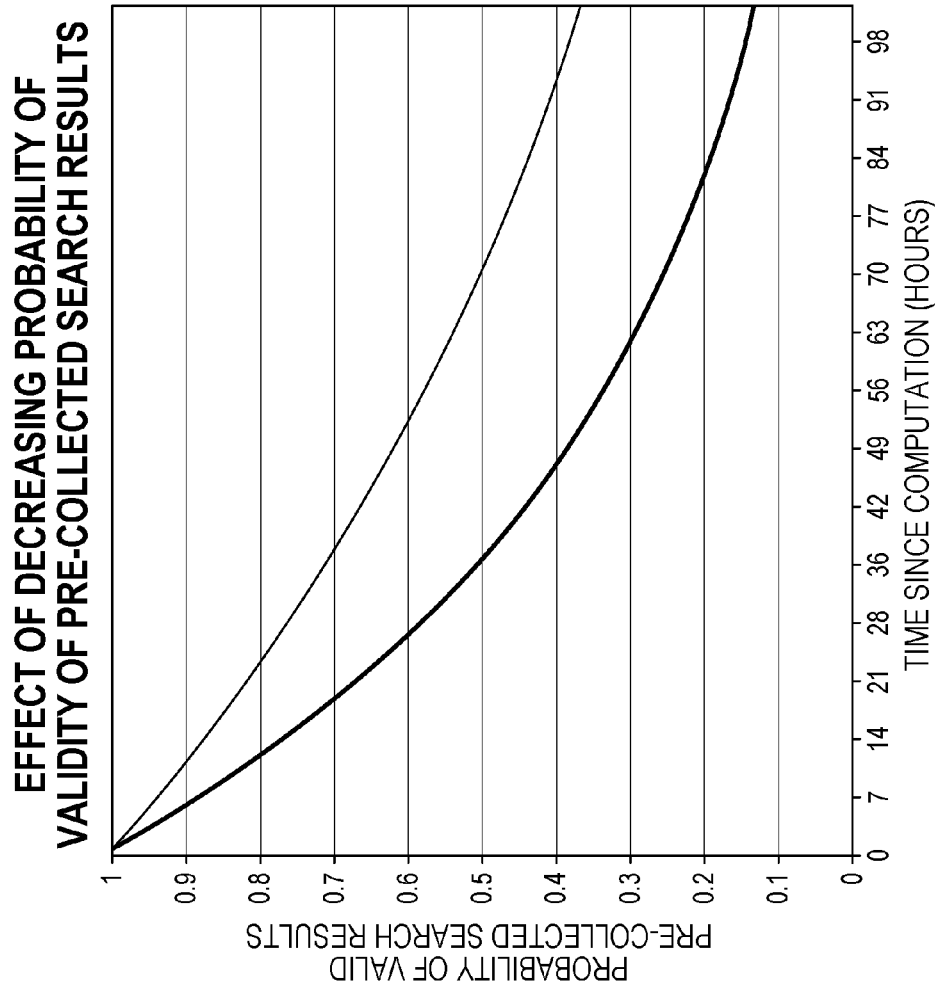
FIG. 2 illustrates a probabilistic model predicting decreasing accuracy of a pre-computed search result over time.

This is also referred to as the expected accuracy $acc_i^t = e^{-\lambda_i t}$ or, more general, as the probability of a pre-computed search result being valid or, in other words, not being outdated. Two exemplary functions of this probable accuracy decreasing over time are depicted by FIG. 2. Function 10 represents a pre-computed search result which potentially remains more accurate (or, more correctly, stays at a higher probability of being valid over time) than another pre-computed search result associated with function 11. For example, the pre-computed search result represented by function 10 has 70% probability of being still valid at 35 hours after its last re-computation, while the other pre-computed search result characterized by function 11 is only valid up to about 50% at 35 hours after its latest re-computation. Functions 10 and 11 may also represent whole sets of pre-computed search results and then indicate proportions of the sets of pre-computed search results likely being valid at a time passed since the last re-computation of the set.

The initial expected accuracy: pre-computed search results generated by the computation platform 3 may not necessarily be accurate even at computation time if, for example, the computation platform 3 itself bases its computations on cached (and therefore outdated) data. This leads to additional discrepancies between pre-computed search results computed by the computation platform 3 and computation results hypothetically been generated by accurate underlying data. This discrepancy may be measured if respective feedback is available. It can be inferred, for example, from the previous computations that pre-computed search result i has a probability $a_i$ to be accurate at the time of computation by computation platform 3. It means that the probability for a pre-computed search result to be accurate after a given time t is $a_i e^{-\lambda_i t}$.

The accuracy of the overall pre-computed search results kept in the search platform 4 according to this exemplary model may then be considered as the mean accuracy ("global accuracy"):

$$\text{GlobalAccuracy} = \text{Avg}(a_i e^{-\lambda_i t}).$$

The "popularity" $p_i$ of the pre-computed search result i is the average access frequency to this pre-computed search result by the end users. As already briefly indicated above, it may be desirable to achieve a better accuracy for pre-computed search results that are more often requested by the users than other pre-computed search results. Thus, the accuracy of the whole sum of pre-computed search results in the database 2, as seen by the end users, may also be defined in that each accuracy value is weighted by the popularity of the respective pre-computed search result. Thus, the proportion of accurate accesses to the pre-computed search results as opposed to the expected proportion of accurate pre-computed search results is included:

$$UserAccuracy = \sum \frac{p_i}{p_{tot}} a_i e^{-\lambda_i t_i},$$

wherein $p_{tot}$ is defined as the sum of all $p_i$.

These parameters assigned to any pre-computed search result form a probabilistic accuracy model utilized for deciding which pre-computed search results in the database 4 receive priority for re-computation. The values of these parameters are, for example, derived from and set according to statistical history data derived from a statistics server based on several days, weeks, months, etc. of history. Every single pre-computed search result is modeled with these parameters in order to predict the state of the pre-computed search results and thus to predict the accuracy of all pre-computed search results.

In general, there are several ways of utilizing the information from the probabilistic model in order to prioritize and to decide which pre-computed search results to next re-compute. These prioritized pre-computed search results are also referred to as the "most critical" to re-compute. One natural approach for building a criticality criteria could be to find the computation orders that are supposed to increase at most the accuracy of the overall set of pre-compute search requests stored in the database 4 from the perspective of the end user ("User accuracy"), i.e., these pre-computed search requests with the highest likelihood of being invalid, weighted by their popularity. Such a strategy is, for example, disclosed by WO 99/22315 by proposing to refresh those objects in a cache with the highest product Pi=Psi(t)×Pri(h).

The approach determines the set of pre-computed search results C to re-compute which increases at most the user accuracy of the overall set of pre-computed search results stored in the database 4 (briefly "dd" for "data domain"):

$$UserAccuracy = \sum_{x_i \in dd} \frac{p_i}{p_{tot}} a_i e^{-\lambda_i t_i},$$

and costs less than R, R denoting the available resources for the next re-computation cycle):

$$Cost(C) = \sum_{x_i \in C} c_t \leq R.$$

Re-computing pre-computed search result i would increase the user accuracy by $$a_i \frac{p_i}{p_{tot}} (1 - e^{-\lambda_i t_i}),$$

which is referred to as gain $$G_i = a_i \frac{p_i}{p_{tot}} (1 - e^{-\lambda_i t_i}).$$

This approach may be further refined by considering the computation costs (i.e., computing resources) required to re-compute a set of pre-computed search request. If the computation costs for re-computing pre-computed search request $x_i$ is denoted as $c_i$, the highest gain-cost-ratio is sought in order to increase the "user accuracy" most efficiently, i.e., best increase with least utilization of computation resources. This gain-cost-ratio can be defined to be:

$$\frac{G_i}{c_i} = a_i \frac{p_i}{p_{tot}} \frac{1 - e^{-\lambda_i t_i}}{c_i}.$$

The process for determining the pre-computed search results to be re-computed then includes the following activities. The re-computation controller 2 sorts the pre-computed search request by this gain-cost-ratio. The re-computation controller 2 selects the top pre-computed search requests from this sorted list until their cumulated computation costs reaches the amount of computation resources R available at the computation platform 3, for example, for a certain period of time forming a re-computation cycle.

Figure 3A:
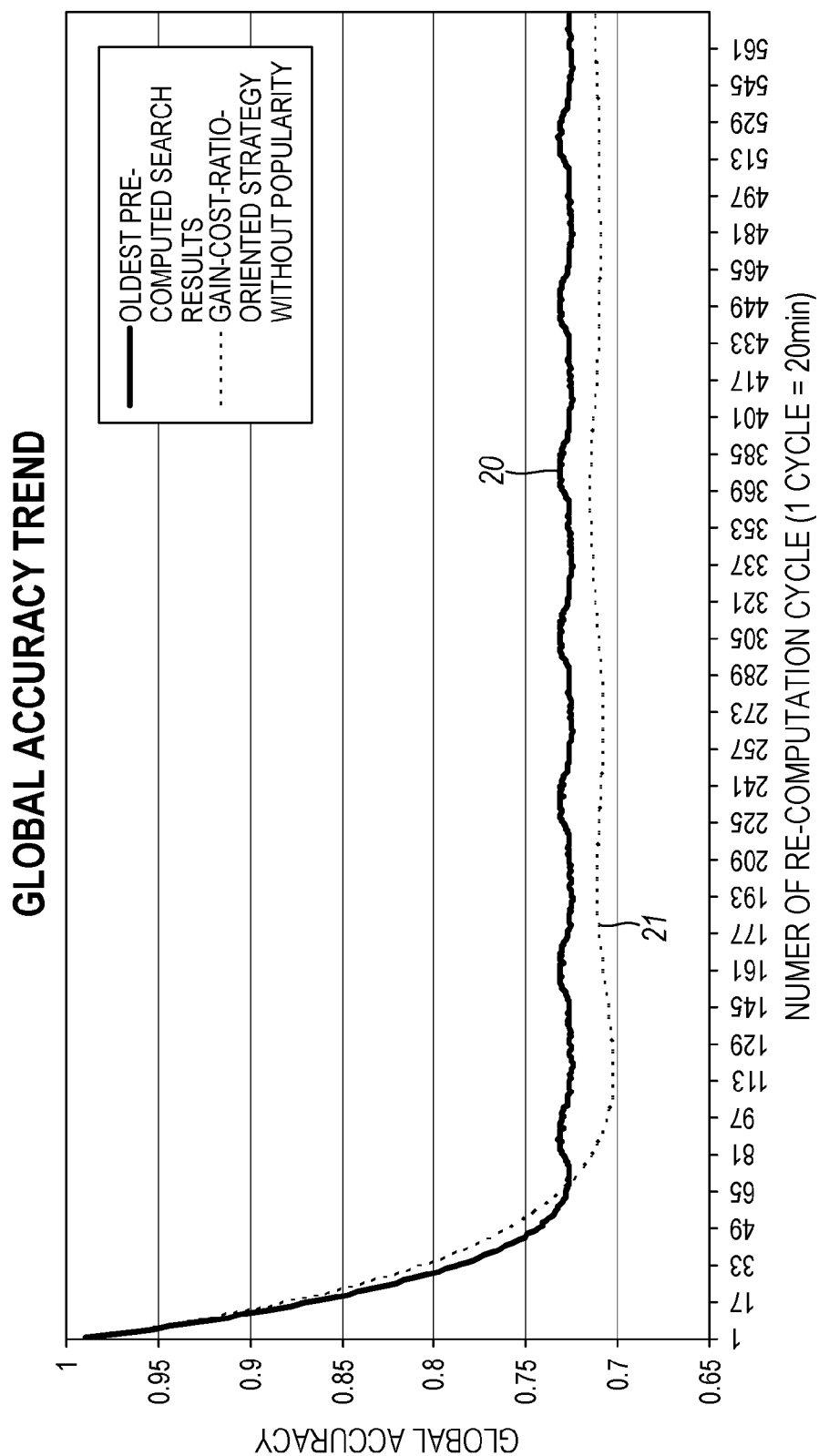
FIGS. 3A, 3B, and 3C visualize the effects of a re-computation strategy focusing on re-computing volatile pre-computed search results.
Figure 3B:
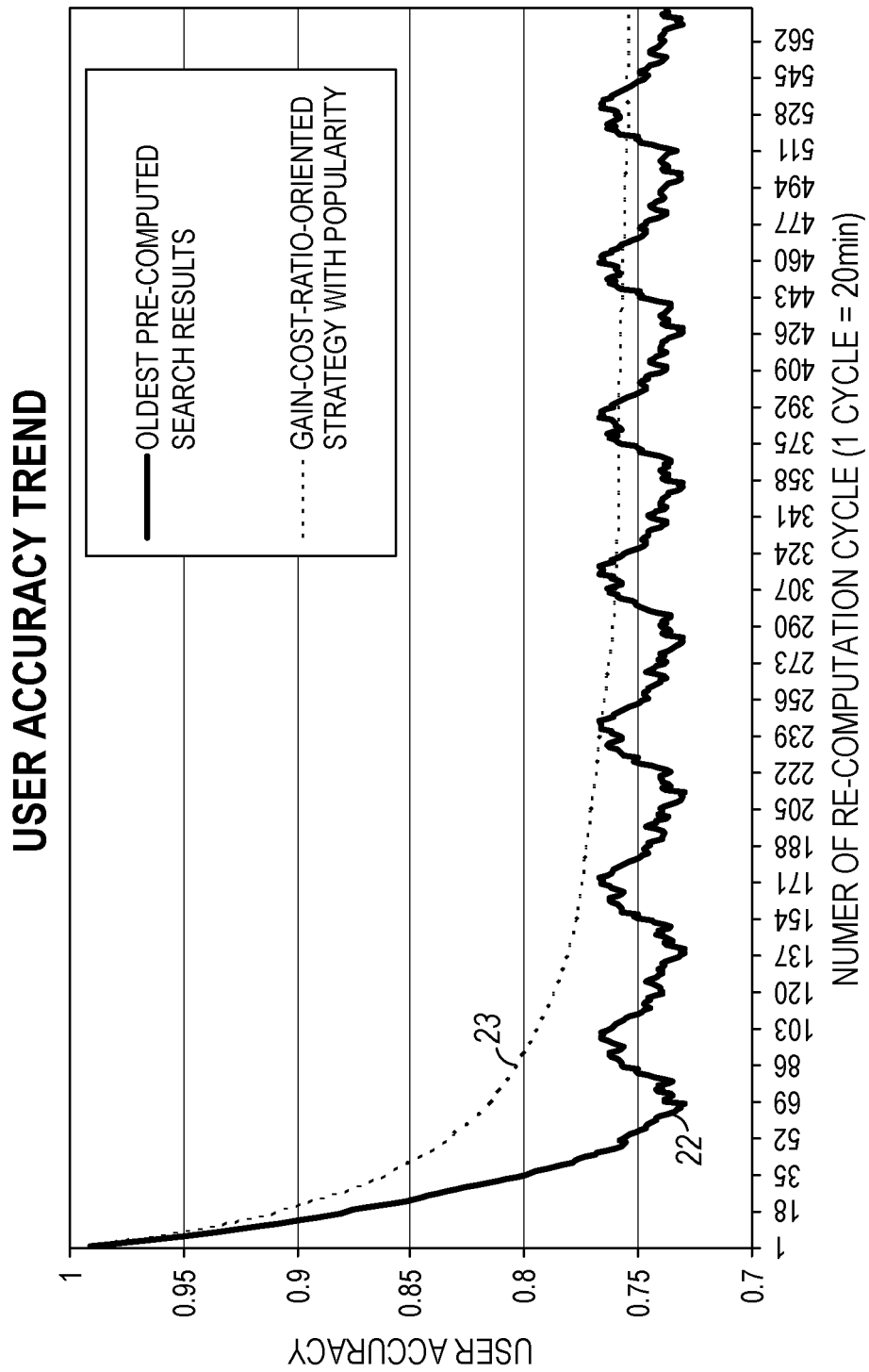
Figure 3C:
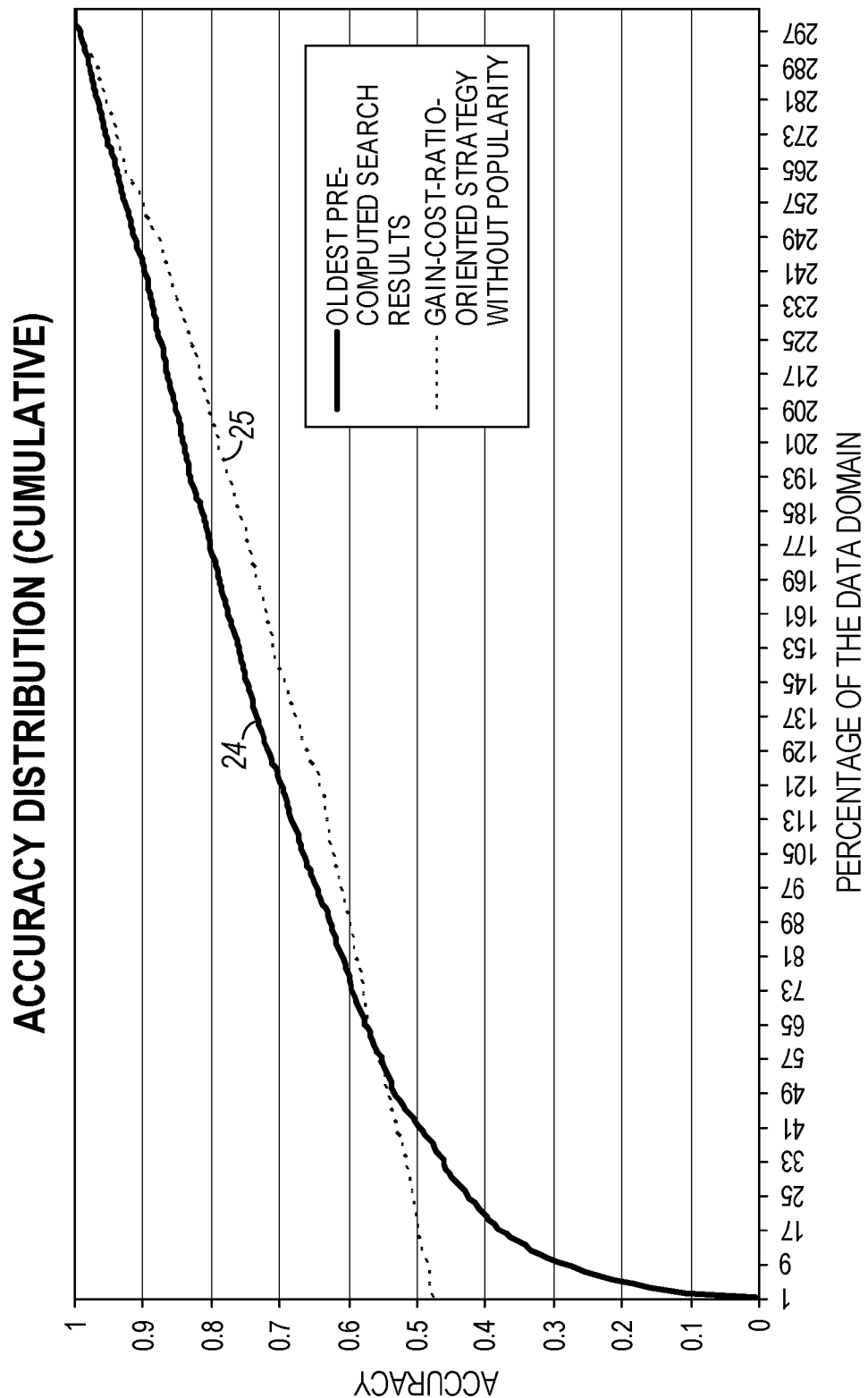
Figure 4A:
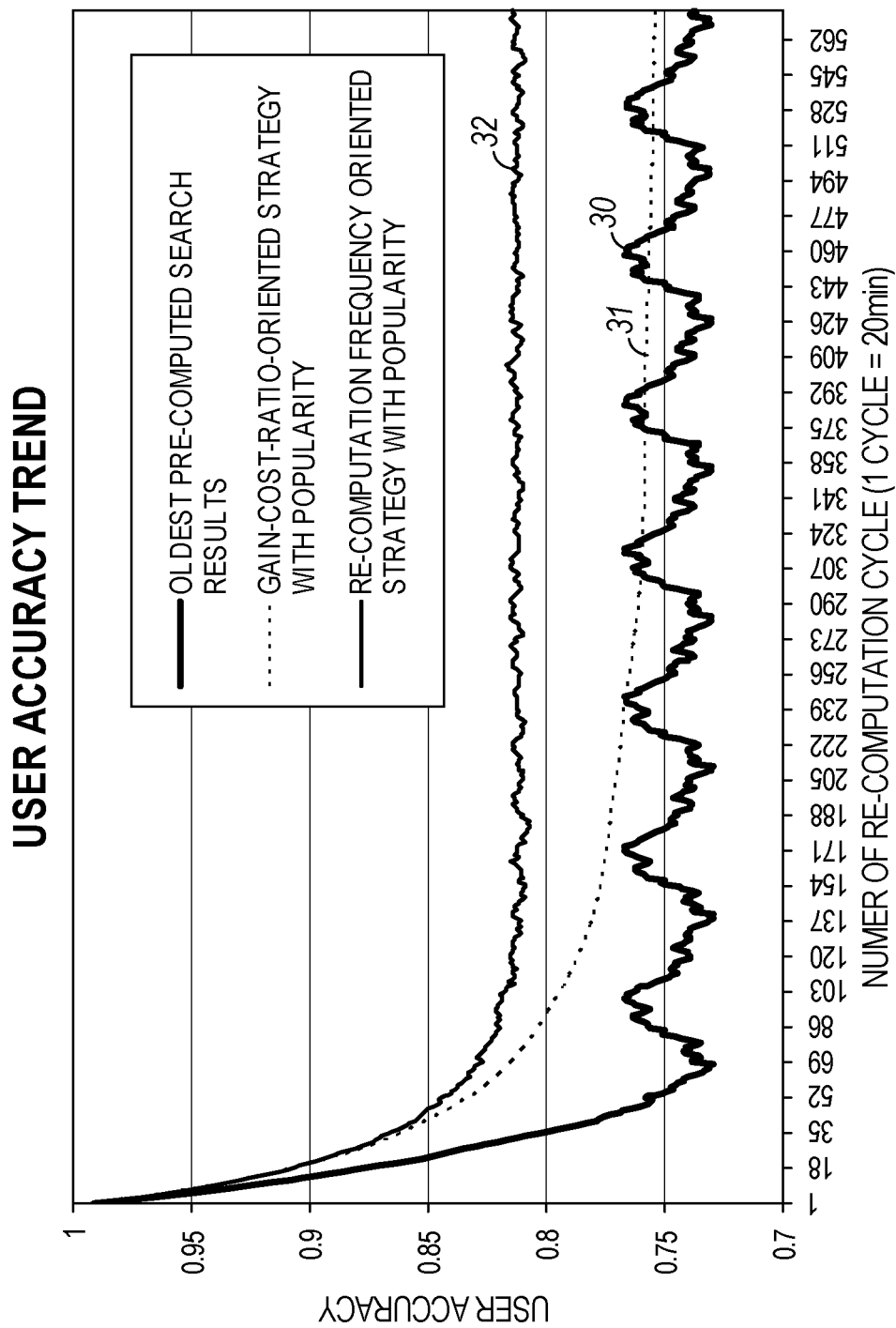
FIGS. 4A and 4B visualize the effects of a re-computation strategy taking into account re-computation frequencies and/or re-computation costs for re-computing pre-computed search results and their search popularity.
Figure 4B:
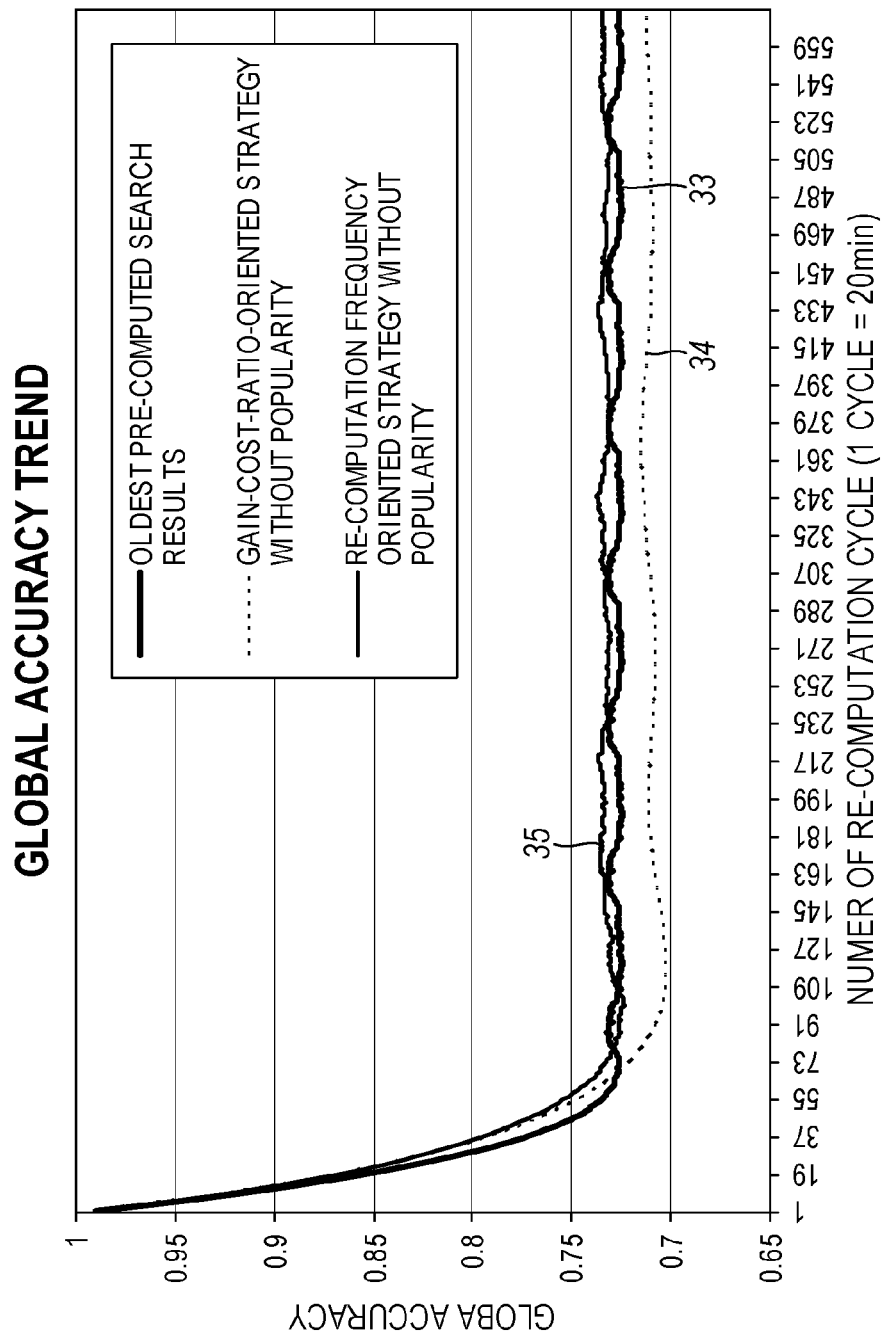

A behavior of the accuracy of the pre-computed search results over time when employing this re-computation approach is indicated by FIGS. 3A, 3B, and 3C that, along with FIGS. 4A and 4B, show graphs obtained by simulation on artificial pre-computed search results using a computation platform 3 equipped with an adequate amount of computation resources. A normal fluctuation within the underlying calculation data has been assumed, for example, an average validity rate of about 2% per hour meaning 2% of the simulated pre-computed search results get outdated every hour (e.g., 98 of 100 pre-computed search results are still valid after one hour, after 10 hours, only $0.98^{10}=82$ of the 100 pre-computed search results are still valid, and so on). It should be noted that this example of an average 2% validity rate does not imply a homogenous validity rate of all simulated pre-computed search results. Rather, the validity rate of individual simulated pre-computed search results may vary (as in reality) and is only in average at around 2%. To highlight the development of the pre-computed search results' accuracy, the simulations start out from an ideal situation with all of the pre-computed search results corresponding to their underlying calculation data, i.e., all pre-computed search results are valid and accurate, respectively.

FIG. 3A shows the long-term development of the global accuracy of (all) the pre-computed search results stored in the search platform 4. As outlined above, the term "global accuracy" refers to the average popularity of all the simulated pre-computed search results. The number of re-computation cycles, which each last, for example, for 20 minutes, is plotted on the X axis. The percentage of valid pre-computed search results is plotted on the Y axis. Function 20 show the development of the pre-computed search results' validity when employing a naïve re-computation strategy, namely always re-compute those pre-computed search results which have not been re-computed for the longest period of time (the so-called "oldest" pre-computed search results). It can be seen that the global accuracy of the pre-computed search results rapidly decreases with the first tens of re-computation cycles. It falls below 75% around the 45th re-computation cycle and then constantly remains between 70% and 75%. Compared to this naïve re-computation approach, the strategy based on the gain-cost ratio as deduced in detail above is shown by graph 21 in FIG. 3A. The gain-cost-ratio-oriented strategy shown by FIG. 3A does, however, not consider the popularity of the pre-computed search results, i.e., the re-computation strategy is e.g., based on the formula $$\frac{1 - e^{-\lambda_i t_i}}{c_i}.$$

It is readily apparent that the gain-cost ratio approach does not significantly improve the global accuracy of the pre-computed search results. During the first tens of re-computation cycles, the pre-computed search results' accuracy still stays above function 20, although insignificantly. However, from around re-computation cycle 70, function 21 even falls below function 20 and remains only slightly above 70% accuracy throughout the following re-computation cycles. Thus, in the long run, the gain-cost ratio approach actually leads to a decreased validity of the pre-computed search results, compared to the naïve re-computation strategy of always re-computing the "oldest" pre-computed search results.

FIG. 3B shows the effects of the gain-cost-ratio-oriented strategy in relation to the naïve re-computation strategy if the gain-cost-ratio-oriented strategy also considers the "popularity" of the pre-computed search results, i.e., the more popular pre-computed search results are re-computed more often than the less popular pre-computed search results (which is, as described above, reflected by the term "user accuracy" implying that the "user experience" is improved for which the pre-computed search results being more often requested than others are more important). Thus, the gain-cost-ratio-oriented strategy of FIG. 3B is characterized e.g., by the formula $$p_i \frac{1 - e^{-\lambda_i t_i}}{c_i}.$$

As indicated by graph 23 of FIG. 3B, the gain-cost-ratio-oriented re-computation strategy generally achieves an improved accuracy of the pre-computed search results than the naïve re-computation (being shown by graph 22). This improvement, however, is caused by the fact that the naïve re-computation strategy does, by definition, not take into account the popularity of the pre-computed search results. This results in the "up and down" of graph 22 because the re-computing unpopular search result leads to a decrease of the "user accuracy". Thus, the comparison between the naïve strategy and the gain-cost-ratio-oriented strategy considering popularity is biased to some extent. As we will, however, show further below, it can be drawn from FIG. 3B (in comparison with FIG. 4A further below) that the gain-cost-ratio-oriented strategy including popularity as visualized by FIG. 3B yields a user accuracy which is still in the general range of the user accuracy resulting from the naïve strategy.

Similar conclusions can be drawn from FIG. 3C which shows a cumulative accuracy distribution of all pre-computed search results stored in search platform 4 at the end of the simulation. The X axis indicates the percentage of pre-computed search results, while the Y axis again indicates the percentage of pre-computed search results being valid. Again, line 24 indicates the naïve "re-compute oldest first" strategy, while graph 25 shows the strategy based on the gain-cost ratio (i.e., a value of 40% on the X axis and 0.7 on the Y axis indicates that 40% of the pre-computed search results have an accuracy of less than 70%). It can be taken from FIG. 3C that the gain-cost-ratio-oriented re-computation strategy achieves some improvements (compared to naïve strategy) for the most inaccurate pre-computed search results. With that strategy, the most inaccurate about 18% of all pre-computed search results still have an accuracy of around 50%, whereas the naïve strategy leads to significantly more inaccurate 18% of the pre-computed search results, about 10% of the pre-computed search results even have an accuracy less than 40%. On the other hand, the naïve re-computation strategy appears to yield superior results for the other 80% more accurate the pre-computed search results, as can be inferred from the progress of the curves 24 and 25 to the right-hand side of FIG. 3C.

Thus, FIGS. 3A, 3B, and 3C convey the insight that the gain-cost-ratio-oriented re-computation strategy is not optimal. To the contrary, it generally results in a decreased average accuracy of pre-computed search results, compared with the naïve strategy to re-compute the "oldest" pre-computed search results, when considering the long-term development. Hence, selecting pre-computed search results for re-computation by employing the gain-cost ratio apparently constitutes a short-term optimization only. The inventors have recognized that this strategy spends too much computing resources on the very volatile pre-computed search results, i.e., pre-computed search results which become invalid more often than others. It is the goal of this strategy to maintain these volatile pre-computed search results at an acceptable accuracy level. In other words, with reference to FIG. 3C, the gain-cost-ratio oriented strategy focuses on the left-hand side of FIG. 3C and re-computes the 18% or 20% of the pre-computed search results with the least accuracy more often than the other 80% with the effect that the 18% or 20% remain at a relatively moderate accuracy level, while the other 80% are virtually neglected. On the other hand, the naïve algorithm leaves the 18% or 20% of the pre-computed search results with the least accuracy in a "bad state" (i.e., with very low accuracy down to 0% to 45%), but achieves a better average result for the other 80% (FIG. 3C) and in long term (FIG. 3A).

Thus, a re-computation strategy is sought which provides superior accuracy of pre-computed search results in the long run.

To this end, the re-computation controller 2 assigns a re-computation indicator to any of the pre-computed search results stored in the database 4. This re-computation indicator indicates the priority for re-computation. The re-computation indicator is formed in particular way, by generally taking into account the following factors. One factor is the probability that the pre-computed search result i is valid or outdated, i.e., the "expected accuracy" as introduced above. Another optional factor is an access frequency measure that indicates a request frequency from the database 4, i.e., the "popularity" as introduced above. Other factors are a re-computation frequency and optionally, a measure for the computation resources needed for the re-computation. Hence, the re-computation indicator of pre-computed search result i is based at least on the two factors of the probability that the pre-computed search result i is still valid and on the re-computation frequency of the pre-computed search result i.

More specifically, in some embodiments, the re-computation indicator for a particular pre-computed search result i is generated by weighting the probability that the pre-computed search result i is still valid ("expected accuracy") with the access frequency measure of the pre-computed search result i indicating the frequency of the pre-computed search result i being requested from the database 4 ("popularity") and by multiplying the re-computation frequency of the search result i with the measure for the computation resources needed to re-compute pre-computed search result i. In some embodiments, both products are divided in order to form the re-computation indicator.

By utilizing the re-computation indicator associated with any of the pre-computed search results stored in the database 4, the re-computation controller 2 selects those pre-computed search results for re-computation which have a re-computation indicator indicating the highest need for re-computation. The amount of pre-computed search results re-computed by the computation platform re-computed within a given period of time, e.g., 20 minutes (also referred to as a "re-computation cycle"), is limited by the computation resources of the computation platform 3 that are available for the re-computation the period of time. After having identified the pre-computed search results being most critical to re-compute, the re-computation controller 2 issues a re-computation order to the computation platform 3 to re-compute them within the next re-computation cycle. The computation platform 3 executes this order in a batch-oriented manner and forwards the re-computed search results to the search platform 4.

In some embodiments, the computation platform 3 may also return the result of the re-computation back to the re-computation controller 2 at the same time as the search results. This enables the re-computation controller 2 to continuously assess the re-computation indicator of the pre-computed search results as they are currently stored in the database 4.

A particular example of a re-computation indicator is now presented in more detail and in a more formal manner. This example starts out from the gain-cost ratio which has been defined above as $$a_i \frac{p_i}{p_{tot}} \frac{1 - e^{-\lambda_i t_i}}{c_i}$$

or, neglecting the initial accuracy $a_i$, as $$\frac{p_i}{p_{tot}} \frac{1 - e^{-\lambda_i t_i}}{c_i}.$$

Re-computing a particular pre-computed search result i yields an increase in terms of user accuracy increase, namely the gain given by:

$$G_i = a_i \frac{p_i}{p_{tot}} (1 - e^{-\lambda_i t_i}).$$

If this particular pre-computed search result i is re-computed more often than another pre-computed search results i, for example, twice as often, it can be considered that re-computation of i is twice more expensive than the re-computation of i (assuming that a single re-computation of i and a single re-computation of i consumes the same amount of computation resources of the computation platform 3—which is not necessarily the case as explained further below). The expense of re-computing pre-computed search result i in terms of the relative number of re-computations can be thus defined as:

$$\text{ComputationExpense}_i = c_i \times f_i$$

where $f_i$ denotes a refresh frequency of pre-computed search result i.

Thus, instead of re-computing the pre-computed search results with the highest immediate gain, i.e., the gain-cost ratio as presented above, the pre-computed search results with the highest gain-expense ratio are selected for re-computation, i.e., with the highest $$\frac{G_i}{\text{ComputationExpense}_i}.$$

For reasons of brevity, this re-computing pre-computed search results by using this re-computation criteria is briefly referred to as "re-computation frequency oriented" strategy.

One difficulty of this approach is that the re-computation frequency $f_i$ is generally an unknown value. It is, however, for example be approximated by $1/t_i$, where $t_i$ denotes the time since the last re-computation of pre-computed search result i.

Thus, $c_i/t_i$ can be used as an estimation of the re-computation expense. The re-computation strategy being directed to a long term increase of the pre-computed search results' accuracy then selects pre-computed search results with highest re-computation indicator being defined as:

$$\frac{G_i \times t_i}{c_i} = \frac{p_i}{p_{tot}} \frac{1 - acc_i^{t_i}}{c_i} \times t_i.$$

The effects of the re-computation frequency oriented strategy presented herein, such as the particular example of the re-computation indicator given above, are visualized by FIGS. 4A and 4B.

FIG. 4A shows the user accuracy achieved by the re-computation frequency oriented strategy (indicated by graph 32) in comparison with the results yielded by the naïve strategy of always re-computing the oldest pre-computed search results (indicated by graph 30) and the gain-cost-ratio-oriented strategy including consideration of the "popularity" as explained above (indicated by graph 31), e.g., given by $$p_i \times \frac{1 - acc_i^{t_i}}{c_i} \times t_i.$$

In can be taken from these graphs 30, 31, 32 that the user accuracy of the pre-computed search results stored in the search platform 4 is, in the long run, generally increased by about 7% as compared to the naïve strategy to always re-compute the oldest pre-computed search results and by about 5% as compared to the gain-cost-ratio-oriented strategy.

On the other hand, also the global accuracy is improved by a re-computation frequency oriented strategy which does not take into account the "popularity" of the pre-computed search results, as can be inferred from FIG. 4B. FIG. 4B is based on FIG. 3a as discussed above and additionally visualizes the effect of the re-computation frequency oriented strategy being based on a re-computation indicator of e.g., $$\frac{1 - acc_i^{t_i}}{c_i} \times t_i.$$

FIG. 4B demonstrates that the re-computation frequency oriented strategy yields a significantly improved global accuracy compared to the gain-cost-ratio-oriented strategy (also employed without considering the popularity) and also a global accuracy of the pre-computed search results above that achieved by the naïve re-computation strategy of always re-computing the oldest pre-computed search results.

Optionally, in some embodiments, re-computation indicator is additionally based on the initial accuracy value $a_i$ indicating the expected accuracy of the pre-computed search result i at the time of its re-computation, as it has been introduced further above. In these embodiments, the re-computation indicator is, for example, defined by:

$$\frac{G_i \times t_i}{c_i} - \frac{p_i}{p_{tot}} \frac{a_i(1 - acc_i^{t_i})}{c_i} \times t_i.$$

Further variations of defining the re-computation indicator by the same principles are within the scope of the embodiments of the invention. For example, the re-computation indicator may be given in a more generic way, with a probabilistic model giving the probability of pre-computed search result i to be invalid as $P_{invalid(i)}$, irrespective how $P_{invalid(i)}$ is calculated or estimated. In this more general example, the re-computation indicator is e.g., defined as:

$$\frac{p_i}{p_{tot}} \times P_{invalid}(i) \times \frac{t_i}{c_i}.$$

As explained above, some embodiments may be directed to optimize the global accuracy without taking into account the end user perspective, i.e., the "popularity" of the pre-computed search results. In these embodiments, the re-computation indicator is given by $$P_{invalid}(i) \times \frac{t_i}{c_i}.$$

As described with respect to the embodiments above, $P_{invalid}(i)$ may be given by $P_{invalid(i)} = (1 - e^{-\lambda_i t_i})$. In some embodiment, an initial accuracy factor is further taken into account so that $P_{invalid(i)} = a_i(1 - e^{-\lambda_i t_i})$.

Other embodiments may neglect the re-computation resources required to re-compute a pre-computed search result. In particular, this applies to environments in which every the re-computation of any pre-computed search result requires the same amount of computation resources.

Some embodiments feature a further refined re-computation indicator directed to a re-computation strategy for long-term optimization of the user accuracy implementing the re-computation frequency oriented strategy as deduced above. This refined re-computation indicator corresponds to the following expression:

$$-\frac{p_i}{c_i}\left(t_i e^{-\lambda_i t_i} + \frac{e^{-\lambda_i t_i} - 1}{\lambda_i}\right)$$

This expression is mathematically derived as follows.

A set of re-computation frequencies is defined $\{f_i\}_{i \in dd}$ of a pre-computed search result i. Corresponding periods between re-computation of pre-computed search result i are defined as $$T_i = \frac{1}{f_i}.$$

If the frequency $f_j$ is applied to the pre-computed search result j, then the average accuracy of j is given by:

$$\overline{Acc_i} = \frac{1}{T_i} \int_0^{T_i} e^{-\lambda_i t} dt = \frac{(1 - e^{-\lambda_i T_i})}{\lambda_i T_i}.$$

The average user accuracy is then defined as:

$$\overline{UserAcc} = \sum_{x_i \in dd} \frac{p_i}{p_{tot}} \overline{Acc_i} = \sum_{x_i \in dd} \frac{p_i}{p_{tot}} \frac{(1 - e^{-\lambda_i T_i})}{\lambda_i T_i}.$$

If the computation resources available for a period of time are equal for any period of time then:

$$\Sigma_{x_i \in dd} c_i f_i = R$$

where R are the computation resources allocated per period of time and $x_i$ denotes the pre-computed search results. By replacing the re-computation frequency fi with the time periods $T_i$ between the re-computations, it follows that:

$$\sum_{x_i \in dd} c_i f_i = \sum_{x_i \in dd} \frac{c_i}{T_i} = R.$$

The set of $$\left\{(T_i)_{x_i \in dd}, \sum_{x_i \in dd} \frac{c_i}{T_i} = R\right\}$$

can be denoted as H.

Adding a multiplicator of Lagrange results in a definition of:

$$l(\theta, (T_i)_{x_i \in dd}) = \sum_{x_i \in dd} \frac{p_i}{p_{tot}} \frac{(1 - e^{-\lambda_i T_i})}{\lambda_i T_i} + \theta\left(R - \sum_{x_i \in dd} \frac{c_i}{T_i}\right).$$

Within the set of H, it applies that $l(\theta, (T_i)_{x_i \in dd}) = \overline{UserAcc}$.

Thus, the user accuracy and l have the same maximum in H. And it happens that the maximum of $l(\theta, (T_i)_{x_i \in dd})$ is given in H because l has its maximum for:

$$\frac{\partial l}{\partial \theta} = R - \sum_{x_i \in dd} \frac{c_i}{T_i} = 0.$$

Thus, finding the maximum of $\overline{UserAcc}$ in H is equivalent to find the maximum of l:

$$\frac{\partial l}{\partial T_i} = \frac{\partial}{\partial T_i}\left(\frac{p_i}{p_{tot}} \frac{1 - e^{-\lambda_i T_i}}{\lambda_i T_i}\right) - \theta \frac{\partial}{\partial T_i}\left(\frac{c_i}{T_i}\right)$$

$$\frac{\partial l}{\partial T_i} = -\frac{p_i}{p_{tot}} \frac{e^{-\lambda_i T_i}}{T_i} + \left(\frac{p_i}{p_{tot}} \frac{1 - e^{-\lambda_i T_i}}{\lambda_i T_i^2}\right) + \theta \frac{c_i}{T_i^2}$$

The maximum is found by setting $$\frac{\partial l}{\partial T_i} = 0.$$

If we multiply by $$p_{tot} \frac{T_i^2}{c_i},$$

we have a maximum for:

$$-\frac{p_i}{c_i}\left(T_i e^{-\lambda_i T_i} + \frac{1 - e^{-\lambda_i T_i}}{\lambda_i}\right) + \theta p_{tot} = 0$$

That is, $$\mathcal{F}_i(T_i) \stackrel{\Delta}{=} -\frac{p_i}{c_i}\left(T_i e^{-\lambda_i T_i} + \frac{e^{-\lambda_i T_i} - 1}{\lambda_i}\right) = const$$

The re-computation strategy optimizing the user accuracy indicator can then be employed as follows. The pre-computed search results with the highest $F_i(t_i)$ as defined here are to be recomputed first in order to have the $F_i(t_i)$ as equal as possible ($F_i$ is an increasing function).

It is interesting to compare this refined re-computation indicator with previous re-computation indicator described for the re-computation frequency oriented strategy above, $$\text{e.g., } p_i \frac{1 - acc_i^{t_i}}{c_i} \times t_i$$

which was specifically introduced above:

$$\mathcal{F}_i(T_i) - \frac{p_i(1 - e^{-\lambda_i T_i})}{c_i} t_i = \frac{p_i}{c_i} \frac{1 - \lambda_i, T_i - e^{-\lambda_i T_i}}{\lambda_i} = O\left(\frac{p_i}{c_i} \lambda_i T_i^2\right)$$

This means that for not too low re-computation frequencies that are of a significant amount (i.e., the time period since the last re-computation is not too long), the re-computation indicator introduced further above is a good approximation of the refined re-computation indicator additionally presented here.

Furthermore, if the initial accuracy is re-introduced, the refined re-computation indicator is given by:

$$-\frac{a_i p_i}{c_i}\left(t_i e^{-\lambda_i t_i} + \frac{e^{-\lambda_i t_i} - 1}{\lambda_i}\right).$$

The re-computation frequency oriented strategy has thus-far been discussed by assuming that re-computation of any pre-computed search result by the computation platform 3 requires substantially the same amount of computation resources irrespective of whether the pre-computed search results are computed separately, together with adjacent search results (e.g., same origin, destination and adjacent dates) or any other non-adjacent search results. In practice, however, this assumption cannot be made in general because, for example, certain pre-computed search results and/or their corresponding underlying calculation data are interrelated to each other. Re-computing such interrelated pre-computed search results together (i.e., within the same re-computation cycle) could include synergetic effects and may thus be more efficient than re-computing them separately. Thus, when interrelated pre-computed search results are re-computed together the computation costs per individual pre-computed search result is generally less than the computation cost per individual pre-computed search result required if they are re-computed separately, i.e., in different re-computation cycles. The re-computation frequency oriented strategy above has been deduced without taking into account such synergetic effects of re-computing certain interrelated pre-computed search results as a whole package within a single re-computation cycle.

To promote an understanding of interrelated pre-computed search results, a particular example is given next. This example originates from a particular application of the distributed database environment 1 in the travel industry, i.e., the database 4 keeps travel-related pre-computed search results and makes them available to end users. The following example, however, is not supposed to limit the issue of interrelated pre-computed search results such as a travel data application. Rather, similar or analog conditions allowing a synergetic and, therefore, more efficient re-computation of interrelated pre-computed search results are present in database systems independent from the content of pre-computed data sets. In general, it can be said that any process of re-computing pre-computed search results will aim at a mutualization of re-computation sub-tasks that have to be executed commonly for any pre-computed search result of a set of pre-computed search results. Thus, re-computing pre-computed search results together that have such re-computation task in common is generally favorable over re-computing pre-computed search requests together that do not share similar re-computation sub-tasks.

In a particular embodiment, the pre-computed search requests are round-trip flight data records, each specifying a travel origin and destination and a departure and arrival date (or, as an alternative to the arrival date, a stay duration relating to the departure date). In this example, the database 4 contains pre-computed round-trip travel recommendations for any origin-destination pair and any departure-arrival-date pair to be covered. Table 1 indicates a small excerpt from the pre-computed travel recommendations kept in database 4, the excerpt being travel recommendations for the city pair Nice-Boston ("NCE-BOS") and for departure dates from $1^{st}$ July to $5^{th}$ July with maximum stay duration of five days, the abbreviation "pc-fr x" standing for "pre-computed travel recommendation number x".

TABLE 1

| | NCE-BOS | | | | |
|---|---|---|---|---|---|
| | Dep JULY 1. | Dep JULY 2. | Dep JULY 3. | Dep JULY 4. | Dep JULY 5. |
| Ret JULY 2. | pc-fr 0 | — | — | — | — |
| Ret JULY 3. | pc-fr 1 | pc-fr 5 | — | — | — |
| Ret JULY 4. | pc-fr 2 | pc-fr 6 | pc-fr 10 | — | — |
| Ret JULY 5. | pc-fr 3 | pc-fr 7 | pc-fr 11 | pc-fr 15 | — |
| Ret JULY 6. | pc-fr 4 | pc-fr 8 | pc-fr 12 | pc-fr 16 | pc-fr 20 |
| Ret JULY 7. | — | pc-fr 9 | pc-fr 13 | pc-fr 17 | pc-fr 21 |
| Ret JULY 8. | — | — | pc-fr 14 | pc-fr 18 | pc-fr 22 |
| Ret JULY 9. | — | — | — | pc-fr 19 | pc-fr 23 |
| Ret JULY 10. | — | — | — | — | pc-fr 24 |

The re-computation of a particular pre-computed travel recommendation, for example pc-fr 9 relating to a departure date of 2nd July and a return date of 7th July, is roughly performed by the computation platform 3 by the following set of sub-tasks.

1. One sub-task is to retrieve the possible geographic routes between Nice and Boston including intermediate stops/change, for example: Nice-Paris-Boston, Nice-London-Boston, Nice-New York-Boston, Nice-Paris-New York-Boston, etc.

2. Another sub-task is to find all the possible flights on all the routes retrieved by activity 1: for example Air France 123 and Emirates 7123 on the leg Nice-Paris, Air France 456 and American Airlines 564 and United Airlines 125 on the leg Paris-New York, etc. This activity is performed for the outward part of the travel on the departure date $2^{nd}$ July (sub-task 2a) and for the return part of the travel on the return date 7th July (sub-task 2b) because flights are generally not available on all days.

3. Another sub-task is to check the availability on all the flights determined by activities 2a and 2b, i.e., on $2^{nd}$ July for the outbound part of the journey (=sub-task 3a) and on $7^{th}$ July for the return part of the journey (=sub-task 3b).

4. Another sub-task is to retrieve fares that can be applied to these flights on these dates. A typical fare is rule which yields a price for the whole journey. However, fares may also be valid for the outbound and for the inbound part of the journey on their respective dates in which case they can be retrieved once for the outbound part (=sub-task 4a) and once for the return part of the journey (=sub-task 4b). Fares have restrictions on the departure dates, on the return dates, on the flights to be applied on, and many others. Fares can be combined together, discounted in some specific cases and so on.

5. In a concluding sub-task, the best solution, i.e., the connection with the best price, is kept, returned by the computation platform 3, and stored by the database 4 as pc-fr 9.

These sub-tasks are performed in a similar fashion for any pre-computed travel recommendation. When performing the re-computation for the whole set of pre-computed travel recommendations (pc-fr 0 to pc-fr 24), several re-computation sub-tasks can be mutualized. Executing sub-task 1 is necessary only once for the whole set of pre-computed travel recommendations pc-fr 0 to pc-fr 24 because all these pre-computed travel recommendations belong to the same origin-destination city pair Nice-Boston. Thus, sub-task 1 does not need to be re-done for every pre-computed search result pc-fr 0 to pc-fr 24.

The sub-tasks 2a, 3a and sub-task 4 are, on the other hand, specific to one departure date. They can therefore be re-used for all pre-computed travel recommendations relating to one and the same departure date. Table 2 indicates this for the pre-computed travel recommendations pc-fr 5 to pc-fr 9 relating to the departure date of July $2^{nd}$:

TABLE 2

| | NCE-BOS | | | | |
|---|---|---|---|---|---|
| | Dep JULY 1. | Dep JULY 2. | Dep JULY 3. | Dep JULY 4. | Dep JULY 5. |
| Ret JULY 2. | pc-fr 0 | — | — | — | — |
| Ret JULY 3. | pc-fr 1 | Common Sub-tasks: 2a, 3a, 4a | — | — | — |
| Ret JULY 4. | pc-fr 2 | | pc-fr 10 | — | — |
| Ret JULY 5. | pc-fr 3 | | pc-fr 11 | pc-fr 15 | — |
| Ret JULY 6. | pc-fr 4 | | pc-fr 12 | pc-fr 16 | pc-fr 20 |
| Ret JULY 7. | — | | pc-fr 13 | pc-fr 17 | pc-fr 21 |
| Ret JULY 8. | — | — | pc-fr 14 | pc-fr 18 | pc-fr 22 |
| Ret JULY 9. | — | — | — | pc-fr 19 | pc-fr 23 |
| Ret JULY 10. | — | — | — | — | pc-fr 24 |

Likewise, the sub-tasks 2b, 3b and 4b are specific to one return date and, thus, are commonly performed for pre-computed travel recommendations relating to one and the same return date. This is illustrated by Table 3 for the pre-computed travel recommendations pc-fr 9, pc-fr 13, pc-fr 17 and pc-fr 21, all of which refer to the return date of July $7^{th}$:

TABLE 3

| | NCE-BOS | | | | |
|---|---|---|---|---|---|
| | Dep JULY 1. | Dep JULY 2. | Dep JULY 3. | Dep JULY 4. | Dep JULY 5. |
| Ret JULY 2. | pc-fr 0 | — | — | — | — |
| Ret JULY 3. | pc-fr 1 | pc-fr 5 | — | — | — |
| Ret JULY 4. | pc-fr 2 | pc-fr 6 | pc-fr 10 | — | — |
| Ret JULY 5. | pc-fr 3 | pc-fr 7 | pc-fr 11 | pc-fr 15 | — |
| Ret JULY 6. | pc-fr 4 | pc-fr 8 | pc-fr 12 | pc-fr 16 | pc-fr 20 |
| Ret JULY 7. | — | Common Sub-tasks: 2b, 3b, 4b | | | |
| Ret JULY 8. | — | — | pc-fr 14 | pc-fr 18 | pc-fr 22 |
| Ret JULY 9. | — | — | — | pc-fr 19 | pc-fr 23 |
| Ret JULY 10. | — | — | — | — | pc-fr 24 |

Thus, in summary, only a part of sub-task 4, namely retrieving such fares which are not valid for the whole outbound part of the travel and for the whole return part of the travel, but are specific for sub-sets or particular travel recommendations, has to be performed separately for each pre-computed travel recommendation, while the other sub-tasks can be performed in common for all pre-computed travel recommendations relating to the same origin-destination city pair (true for sub-task 1) or at least for pre-computed travel recommendations relating to the same departure date (sub-tasks 2a, 3a and 4a) or to the same return date (sub-tasks 2b, 3b and 4b). Consequently, the more pre-computed travel recommendations relate to one origin-destination city pair and the more pre-computed travel recommendations relate to one departure date and return date, respectively, the more computation resources can be spared by mutualizing these sub-tasks across the respective pre-computed flight requests.

Figure 5:
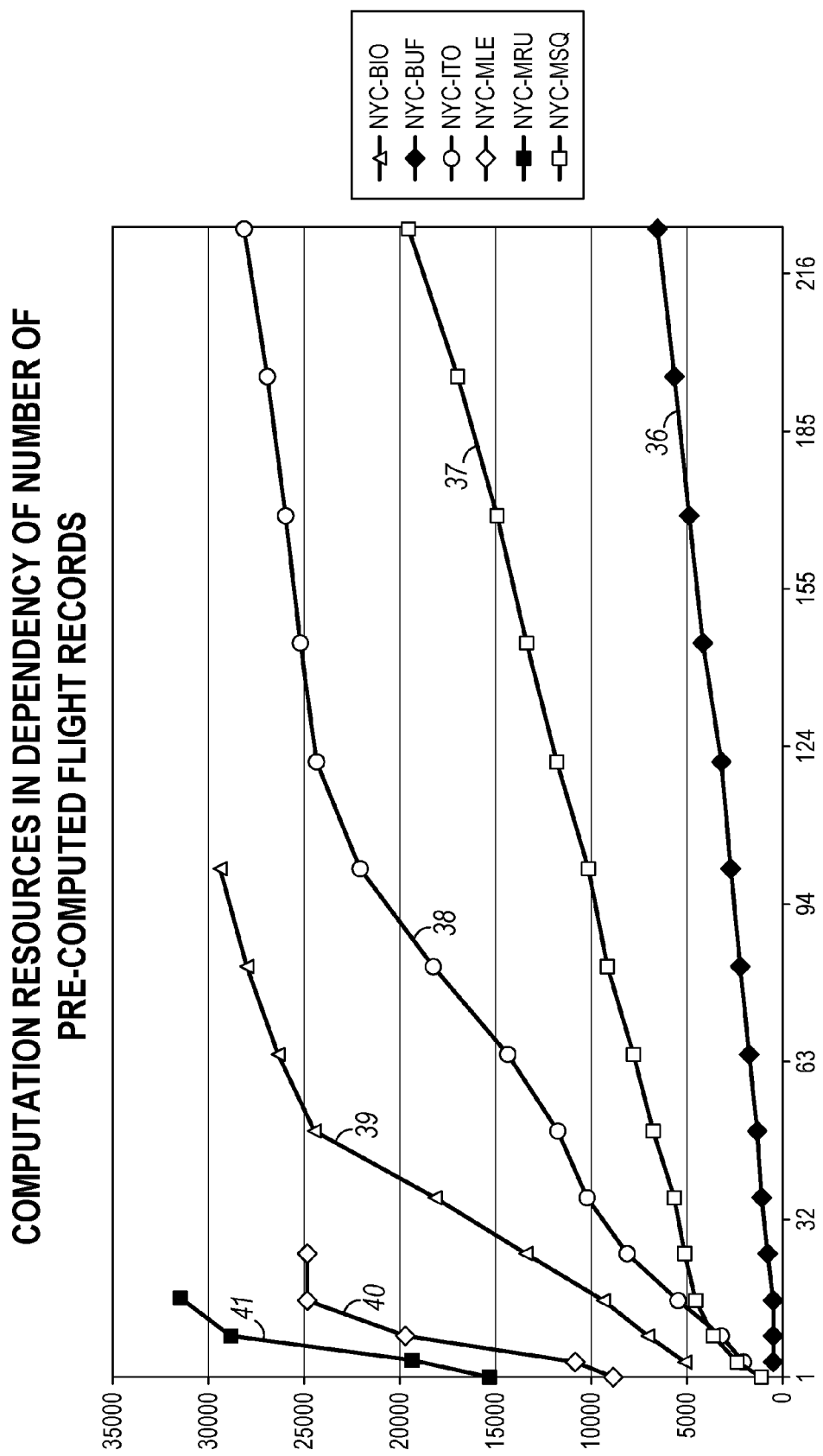
FIG. 5 depicts re-computation costs for different types of pre-computed search result sets.

This relationship between increasing synergetic effects with an increasing number of pre-computed travel recommendations relating to an origin-destination city pair and to one departure or return date is also visualized by FIG. 5. FIG. 5 shows six graphs of exemplary pre-computed travel recommendation sets, each set belonging to one origin-destination city pair. In decreasing number of pre-computed travel recommendations being associated with a city pair, graph 36 relates to the city pair New York-Buffalo, graph 37 relates to the city pair New York-Minsk, graph 38 relates to the city pair New York-Hilo, Hi., graph 39 relates to the city pair New York-Bilbao, graph 40 relates to the city pair New York-Male, and graph 41 relates to the city pair New York-Mauritius. The X axis of the diagram of FIG. 5 denotes the number of pre-computed travel recommendations, while the Y axis plots a measure of re-computation resources needed to perform a re-computation of pre-computed travel recommendations, namely CPU time.

On the one hand, FIG. 5 shows that re-computation of some pre-computed travel recommendation sets requires more computation resources than others. For example, re-computing pre-computed travel recommendations from set 41 including pre-computed travel recommendations for flights between New York and Mauritius is generally more costly than re-computing pre-computed travel recommendations from set 36 including pre-computed travel recommendations for flights between New York and Buffalo. This general difference of the amount of computation resources needed for re-computing pre-computed travel recommendations is taken into account by the including the re-computation costs C into the re-computation indicator as it has been explained in detail above. However, the graphs of FIG. 5 also indicate that the re-computation costs vary with the number of pre-computed travel recommendations of a set being re-computed. In general, the more pre-computed travel recommendations relating to one set are re-computed together, the less computation resources are needed to re-compute each pre-computed travel recommendation. For example, graph 36 indicates that re-computing 32 pre-computed travel recommendations of the set New York-Buffalo requires about 1000 ms of CPU, i.e., about 31.25 ms of CPU per pre-computed travel recommendation, while re-computing 170 pre-computed travel recommendations requires about 5000 ms of CPU, i.e., only about 29.4 ms of CPU per pre-computed travel recommendation. With respect to graph 38 relating to the city pair New York-Hilo, re-computing 35 pre-computed travel recommendations from that set requires about 10,000 ms of CPU, i.e., 286 ms of CPU per pre-computed travel recommendation, while re-computing 140 pre-computed travel recommendations from that set requires about 25,000 ms of CPU, i.e., only 178.5 ms of CPU per pre-computed travel recommendation. Hence, it is clear that the pre-computed travel recommendations belonging to one origin-destination city pair are interrelated in terms of computing resources required for their re-computation as explained above.

In other words, the computation resources needed to re-compute a pre-computed search result i generally depend on whether or not other pre-computed search results related to the pre-computed search result i are re-computed during the same computation cycle. Thus, the computation resources to re-compute the pre-computed search results are not static, but vary with the selection of the set of pre-computed search results to be re-computed during the computation cycle.

These computation resources varying with the number of interrelated pre-computed search results being re-computed together are taken into account by the re-computation strategy employed by some embodiments as follows. Generally, the computation resources needed to re-compute the pre-computed search results to be re-computed are dynamically estimated by the re-computation controller 2 while selecting the pre-computed search results to be re-computed during the next computation cycle. This estimation depends on which other pre-computed search results related to the pre-computed search result i are selected for re-computation during the next re-computation cycle.

In some embodiments, this is achieved by an iteratively refined estimation of the computation resources needed to re-compute the pre-computed search results to be re-computed while determining the subset of the pre-computed search results to be actually re-computed. This iterative estimation of the varying computation resources includes the following activities.

a. For any pre-computed search result i, the computation resources $c_i$ needed to re-compute pre-computed search result i are initialized with a first approximated value. This value assumes that the re-computation of pre-computed search result i is independent from the computation of other pre-computed search results selected for re-computation during the next re-computation cycle.

b. A portion of the pre-computed search results for re-computation is then selected. This selection is, for example, done in accordance with the re-computation indicator as it has been explained above. The selected portion, however, does not already exhaust the complete available computation resources of the computation platform 3 to 100%, but only consumes a part of the available computation resources for the next re-computation cycle. For example, in some embodiments, the selected portion only requires a given percentage of the computation platform's 3 computation resources available for re-computation within the next re-computation cycle. In the embodiments, specific percentages are used as the given percentage, such as 1%, 2%, 5%, 10%, 20%, 25%, 30%, 40%, 50%, or 60% or higher values less than 100%. In any event, the selection of this portion of pre-computed search results to be re-computed in the next re-computation cycle is based on the current values for the computation resources needed to re-compute the portion of pre-computed search results, i.e., in the very first selection iteration still on the basis of the values of the initialization activity a), i.e., without taking into account any interrelations or dependencies between the pre-computed search results to be re-computed.

c. For any pre-computed search result i (including both, the pre-computed search results selected by activity b) before and the pre-computed search results not being selected by activity b)), the re-computation controller 2 re-assesses the computation resources $c_i$ needed to re-compute pre-computed search result i by taking into account which pre-computed search results related to the pre-computed search result i have been selected for re-computation in activity c). For the pre-computed search results being already selected by activity b), this re-assessment provides refined values of $c_i$ and in total a refined value of the percentage of the computation resources of computation platform 3 available for re-computation within the next re-computation cycle necessary to re-compute the pre-computed search results selected for re-computation in the next computation cycle so far. To the extent that interrelated pre-computed search results have been selected in the current iteration, the refined value of $\Sigma\, c_i$ of the already selected pre-computed search results is generally less than the (theoretic) value of $\Sigma\, c_i$ of the already selected pre-computed search results neglecting their interrelation and assuming a re-computation of the already selected pre-computation without re-computing any interrelated pre-computed search results. The re-assessment of the pre-computed search results not (yet) being selected for re-computation is sensible because they are all candidates for a selection in the next iteration(s). If one or more pre-computed search results interrelated to not-yet-selected pre-computed search results has/have been selected in the previous activity b), the computation resources needed for re-computing these not-yet-selected pre-computed search results with interrelated pre-computed search result(s) are generally lower (and is therefore generally to be decreased by this activity c)) than the computation resources required if no interrelated pre-computed search result was selected for pre-computation.

d. The re-computation controller 2 refers back to activity b) if less than 100% of the overall computation resources of the computation platform available for re-computation within the next re-computation cycle are exhausted.

Generally, this approach is independent from the specific manner of how the re-computation indicator is calculated or which kind of re-computation strategy is employed.

Figure 6:
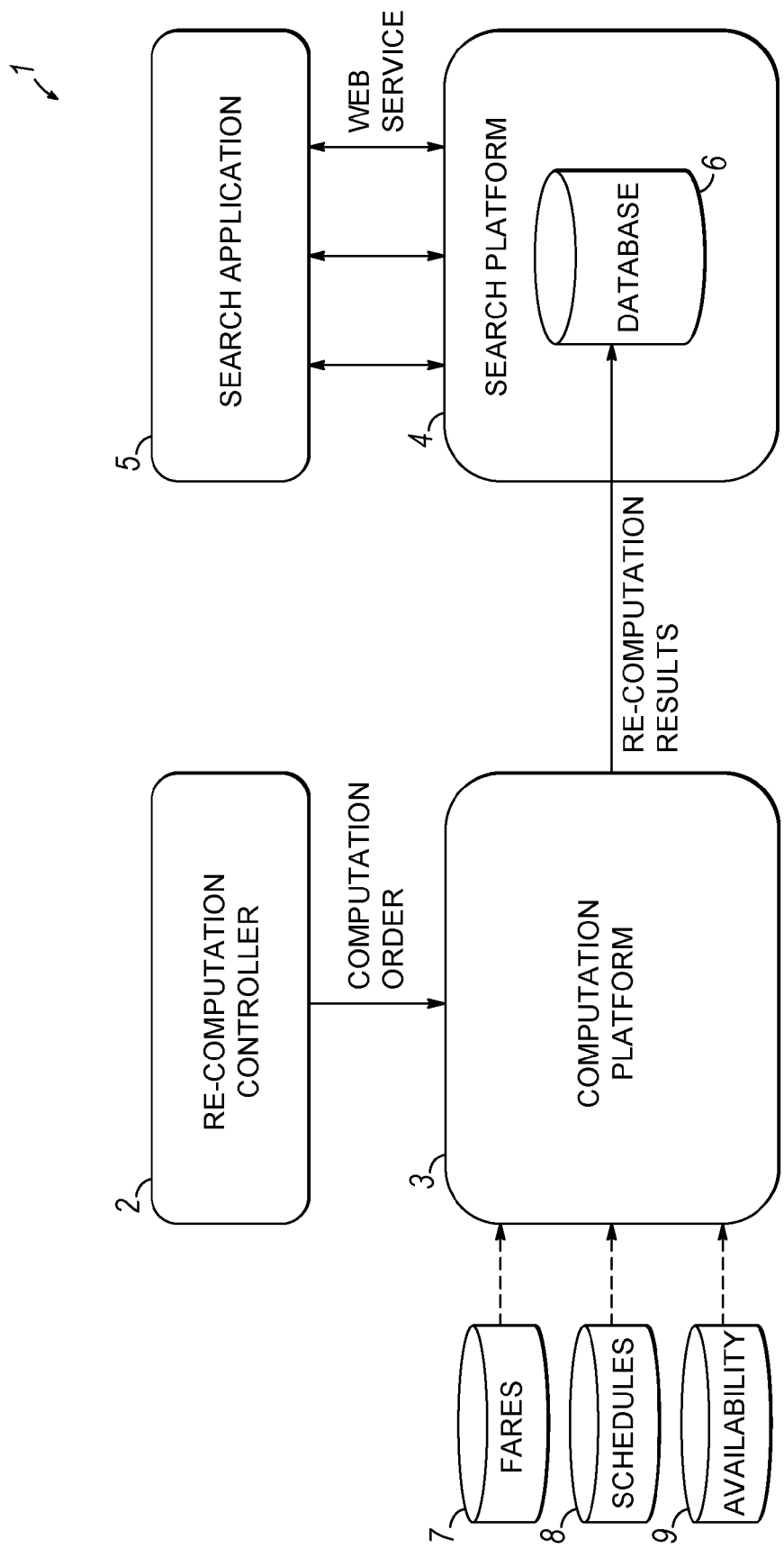
FIG. 6 shows an example of a database environment implementing the methods presented herein.

FIG. 6 shows a travel-related example of a database environment 1 depicting additional details in comparison with FIG. 1. The re-computation controller 2 maintains a representation of the pre-computed search results stored by the search platform 4 e.g., in database 6. The re-computation controller 2 controls the re-computation of the pre-computed search results by employing the re-computation indicator as described in detail above. Pre-computed search results to be re-computed are ordered to be re-computed by computation orders which the re-computation controller 2 transmits to the computation platform 3. The computation platform re-computes the respective pre-computed search results. As depicted by the exemplary environment 1 of FIG. 6, the re-computation performed by the re-computation platform 3 may be based on underlying data such fares kept in a fares database 7, transportation schedules kept in schedule database 8 and transportation availability data kept in availability database 9. The re-computation platform 3 sends the re-computed search results to search platform 4 and returns them to re-computation controller 2. As outlined above, the re-computation controller 2 may be integrated with the computation platform 3 and/or the search platform 4. The pre-computed search results updated in this manner are requested by a search application 5 from the search platform 6 e.g., by using web service interfaces.

Figure 7:
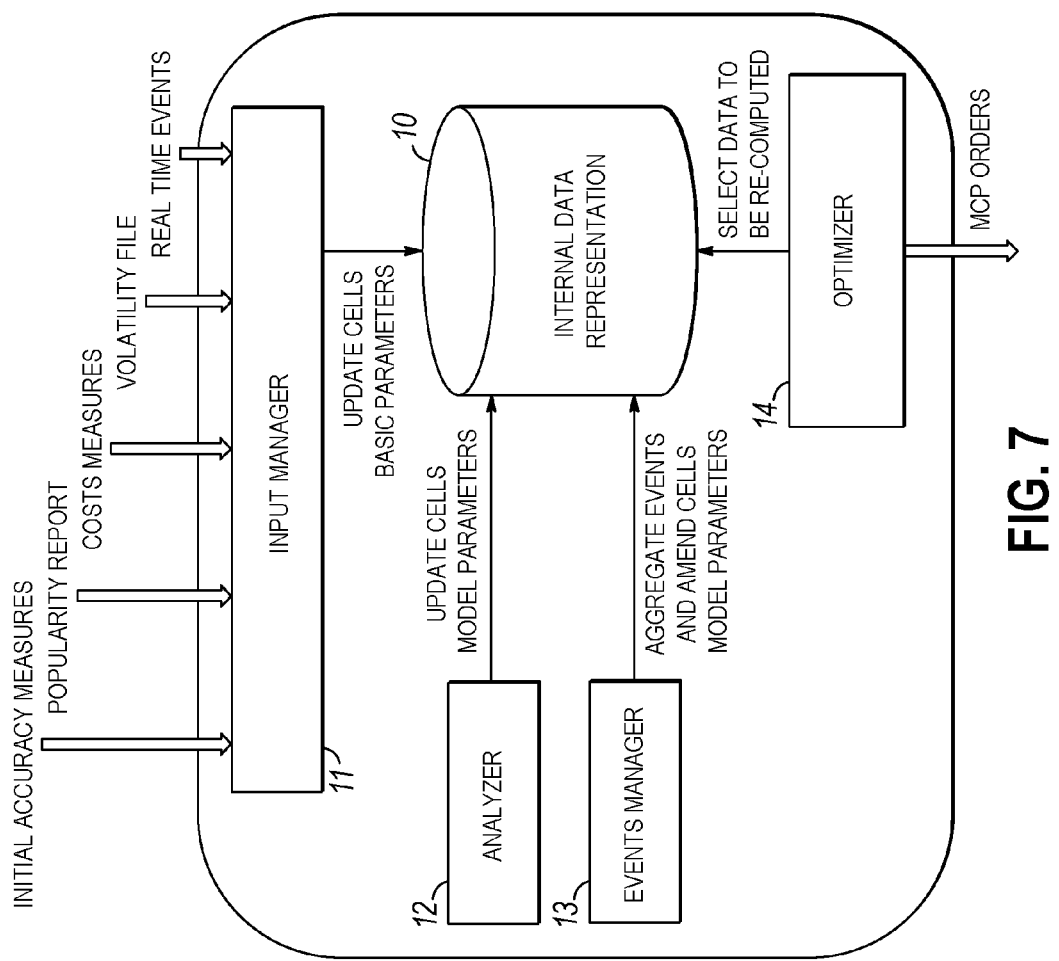
FIG. 7 presents a view on an exemplary inner structure of the re-computation controller.

Now referring to FIG. 7, some embodiments employ a modular structure of the re-computation controller 2 to achieve the methods described above. Some of these parts are already described in the unpublished International application PCT/EP2013/002390, which is incorporated by reference hereinabove and referenced her for a more detailed explanation of the re-computation controller's structure. Some more details regarding the re-computation controller's internal logic and their relations are elaborated here. As shown by FIG. 7, the re-computation controller 2 exemplarily includes the following components:

Internal Data representation component 10: This component provides tools to build, store, update and access big matrixes representing the pre-computed search results stored in the database 4. The main function of Internal Data representation component 10 is to provide a "mirror" of the pre-computed search results stored in the database 4 serving as the basis for analyzing the pre-computed search results in order to decide which of them are to be re-computed in the next re-computation cycle. More precisely, the Internal Data representation component 10 does not hold a one-to-one copy of the pre-computed search results as stored in the database 4, but an appropriate representation which does not have to include every details of the pre-computed search results as stored in the database 4. On the other hand, the Internal Data representation component 10 includes additional control data associated with the pre-computed search results such as the times of their last re-computation and, in particular, the re-computation indicator.

Input manager 11: This component inputs data from heterogeneous sources such as a validity rate database or data source, a popularity database or data source, an initial accuracy database or data source, a costs database or data source, and/or sources indicating real-time events potentially influencing the validity of the pre-computed search results. This data is, for example, used to generate and update the re-computation indicators associated with the pre-computed search results as explained in detail above. The input manager 11 converts the incoming data into the appropriate data formats and updates corresponding matrixes representing the pre-computed search results as stored by the Internal Data representation component 10.

Analyzer 12: This component computes intermediate data matrixes implied by the probabilistic model (accuracy, criticality) on the basis of the matrixes stored by the Internal Data representation component 10.

Events manager 13: This component aggregates information on real-time events information and amends the validity predictions given by the probabilistic model accordingly.

Optimizer 14: This component runs the re-computation strategy, i.e., the re-computation frequency oriented re-computation and the iterative selection of pre-computed search results taking into account varying computation costs of interrelated pre-computed search results as described in detail above. After having determined the pre-computed search results to be recomputed, the optimizer 14 generates re-computation orders and issues them to the computation platform 3. Furthermore, it updates the re-computation time of these pre-computed search results stored in the Internal Data representation component 10.

The latter two modules, the events manager 13 and the optimizer 14, are grouped under the name "consolidator" in PCT/EP2013/002390.

Figure 8:
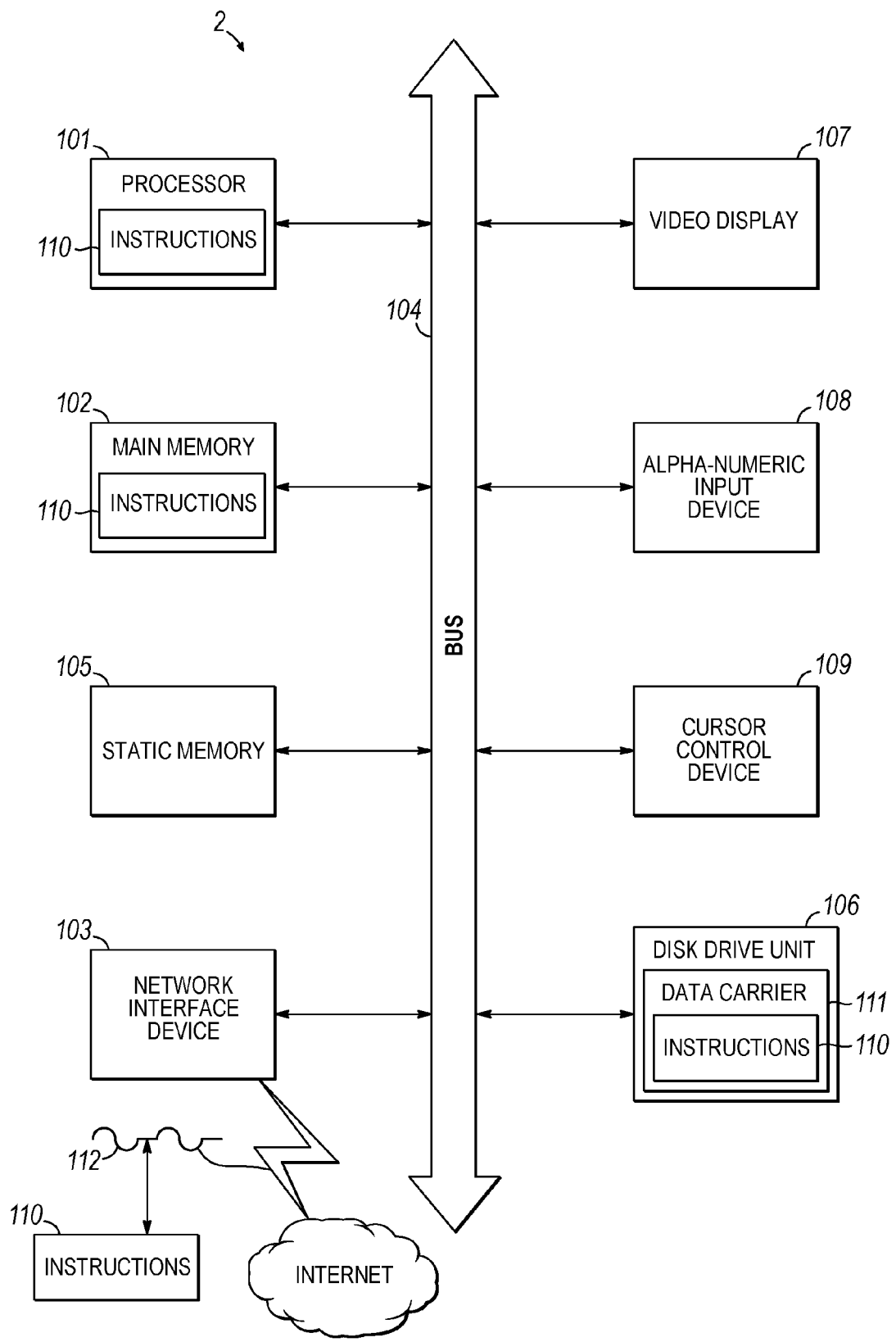
FIG. 8 is an exemplary schematic view of the internal architecture of the query processing server.

Finally, FIG. 8 is a diagrammatic representation of a computer system which provides the functionality of the re-computation controller 2 as shown by FIGS. 2, 6 and 7. Within the re-computation controller 2 a set of instructions, to cause the computer system to perform any of the methods discussed herein, may be executed. The re-computation controller 2 includes at least one processor 101, a main memory 102 and a network interface device 103, which communicate with each other via a bus 104. Optionally, it may further include a static memory 105 and a disk-drive unit 106. A video display 107, an alpha-numeric input device 108 and a cursor control device 109 may form a distribution list navigator user interface. The network interface device 103 connects the data re-computation controller 2 to the computation platform 3, the sources of statistical data needed to fill up the predictive model such as statistics servers, a volatility database or data source and an initial accuracy database or data source, the sources of real-time events, the Internet and/or any other network. A set of instructions (i.e., software) 110 embodying any one, or all, of the methods described above, resides completely, or at least partially, in or on a machine-readable medium, e.g., the main memory 102 and/or the processor 101. A machine-readable medium on which the software 110 resides may also be a non-volatile data carrier 111 (e.g., a non-removable magnetic hard disk or an optical or magnetic removable disk) which is part of disk drive unit 106. The software 110 may further be transmitted or received as a propagated signal 112 via the Internet through the network interface device 103.

The present re-computation strategy provides a means to automatically generate re-computation decisions which are directed to improve the validity of pre-computed search results. It determines which pre-computed search results are to be re-computed and controls the re-computation also time-wise by taking into account the available computation resources at the computation platform. Thus, in general, the accuracy/validity of the pre-computed search results is estimated on the probabilistic model which models the up-to-dateness and out-of-dateness, respectively, over time, and takes into account a re-computation frequency of the pre-computed search results. Pre-computed search results which are re-computed more often than others are considered to be more "expensive" to keep up-to-date. In this way, an ineffective focus on constantly re-computing very volatile pre-computed search result is avoided.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method of refreshing a cache of pre-computed search results in a database, the method comprising:
   associating, by a re-computation controller, a re-computation indicator with each pre-computed search result i in the database;
   assigning, by the re-computation controller, a first value to the re-computation indicator of each pre-computed search result i in the database, the first value being based at least partially on a product of a probability $P_{invalid}(i)$ that the respective pre-computed search result i is invalid, an amount of time $t_i$ since the respective pre-computed search result i was last computed, and an amount of computation resources $c_i$ needed to re-compute the respective pre-computed search result i;
   re-computing, by a computation platform, a number of the pre-computed search results in order of the first value of each respective re-computation indicator, starting with the re-computation indicator having the first value that is highest; and
   updating the number of the pre-computed search results in the cache using the re-computed search results,
   wherein re-computing each pre-computed search result i includes performing one or more sub-tasks, and the amount of computation resources $c_i$ needed to re-compute each respective pre-computed search result i is determined by:
      initializing the amount of computation resources c, needed to re-compute each pre-computed search result i at a second value that assumes each sub-task performed to re-compute the pre-computed search result i will be performed independently from the re-computation of all other pre-computed search results selected for re-computation during the re-computation cycle,
      selecting a portion of the pre-computed search results for re-computation in accordance with the re-computation indicators based on the second values for the computation resources $c_i$ needed to re-compute the portion of the pre-computed search results so that re-computing the selected portion of the pre-computed search results would use a given percentage of the computation platform's overall computation resources available for re-computation within the re-computation cycle, and
      re-assessing the amount of computation resources $c_i$ needed to re-compute each pre-computed search result i based on an actual percentage of the computation platform's overall computation resources that would be used for the previous re-computation taking into account the sub-tasks that would be executed commonly for the other pre-computed search results of the portion of pre-computed search results, and
   wherein the number of the pre-computed search results that is re-computed is based on an amount of computation resources of the computation platform available for the re-computation within a re-computation cycle.

2. The method of claim 1 wherein the first value of each re-computation indicator is defined by $P_{invalid}(i) \times t_i / c_i$.

3. The method of claim 1 wherein the re-computation indicator is defined by $p_i \times P_{invalid}(i) \times t_i / c_i$, and $p_i$ is an access frequency of the pre-computed search result i from the search platform.

4. The method of claim 1 further comprising:
   generating, by the re-computation controller, re-computation orders for the number of pre-computed search results;
   transmitting the re-computation orders from the re-computation controller to the computation platform; and
   in response to the re-computation orders, re-computing, by the computation platform, the pre-computed search results indicated by the re-computation orders.

5. The method of claim 1 wherein the probability that each pre-computed search result is invalid is defined by $(1-e^{-\lambda_i t_i})$, and $\lambda_i$ is a validity rate of the pre-computed search result i modeled by a probabilistic model.

6. The method of claim 1 wherein the re-computation indicator is further based on an initial accuracy value indicating an expected accuracy of each pre-computed search result at the time of re-computation.

7. The method of claim 1 wherein the amount of computation resources c; needed to re-compute each pre-computed search result i depends on whether or not other pre-computed search results related to the pre-computed search result i are re-computed during the re-computation cycle, and the amount of computation resources $c_i$ needed to re-compute each pre-computed search result i is dynamically estimated depending on which other pre-computed search results related to the pre-computed search result i are selected for re-computation during the re-computation cycle.

8. The method of claim 1 wherein determining the amount of computation resources c, needed to re-compute each respective pre-computed search result i further comprises iteratively selecting the pre-computed search results for re-computation by the computation platform within the re-computation cycle by:
   continuing to select another portion of the pre-computed search results for re-computation and re-assess the amount of computation resources $c_i$ needed to re-compute each pre-computed search result i until 100% of the computation platform's overall computation resources available for re-computation within the re-computation cycle is being used to re-compute each selected portion of the pre-computed search results.

9. An apparatus for refreshing a cache of pre-computed search results in a database, the apparatus comprising:
   at least one processor; and
   a memory coupled to the at least one processor, the memory including instructions that, when executed by the at least one processor, cause the apparatus to:
      associate a re-computation indicator with each pre-computed search result i in the database;
      assign a first value to the re-computation indicator of each pre-computed search result i in the database, the first value being based at least partially on a product of a probability $P_{invalid}(i)$ that the respective pre-computed search result i is invalid, an amount of time $t_i$ since the respective pre-computed search result i was last computed, and an amount of computation resources $c_i$ needed to re-compute the respective pre-computed search result i;
      re-compute a number of the pre-computed search results in order of the first value of each respective re-computation indicator, starting with the re-computation indicator having the first value that is highest; and
      update the number of the pre-computed search results in the cache using the re-computed search results,
      wherein re-computing each pre-computed search result i includes performing one or more sub-tasks, and the amount of computation resources $c_i$ needed to re-compute each respective pre-computed search result i is determined by:
    initializing the amount of computation resources $c_i$ needed to re-compute each pre-computed search result i at a second value that assumes each sub-task performed to re-compute the pre-computed search result i will be performed independently from the re-computation of all other pre-computed search results selected for re-computation during the re-computation cycle,
    selecting a portion of the pre-computed search results for re-computation in accordance with the re-computation indicators based on the second values for the computation resources c, needed to re-compute the portion of the pre-computed search results so that re-computing the selected portion of the pre-computed search results would use a given percentage of the computation platform's overall computation resources available for re-computation within the re-computation cycle, and
    re-assessing the amount of computation resources $c_i$ needed to re-compute each pre-computed search result i based on an actual percentage of the computation platform's overall computation resources that would be used for the previous re-computation taking into account the sub-tasks that would be executed commonly for the other pre-computed search results of the portion of pre-computed search results, and
  wherein the number of the pre-computed search results that is re-computed is based on an amount of computation resources of a computation platform available for the re-computation within a re-computation cycle.

10. The apparatus of claim 9 wherein the first value of the re-computation indicator is defined by $P_{invalid}(i) \times t_i / c_i$.

11. The apparatus of claim 9 wherein the re-computation indicator is defined by $p_i \times P_{invalid}(i) \times t_i / c_i$, and $p_i$ is an access frequency of the pre-computed search result i from the search platform.

12. The apparatus of claim 9 wherein the probability that each pre-computed search result is invalid is defined by $(1-e^{-\lambda_i t_i})$, and $\lambda_i$ is a validity rate of the pre-computed search result i modeled by a probabilistic model.

13. The apparatus of claim 9 wherein the amount of computation resources $c_i$ needed to re-compute each pre-computed search result i depends on whether or not other pre-computed search results related to the pre-computed search result i are re-computed during the re-computation cycle, and the amount of computation resources $c_i$ needed to re-compute each pre-computed search result i is dynamically estimated depending on which other pre-computed search results related to the pre-computed search result i are selected for re-computation during the re-computation cycle.

14. The apparatus of claim 9 wherein the program code is further configured to cause the apparatus to determine the amount of computation resources $c_i$ needed to re-compute each respective pre-computed search result i by iteratively selecting the pre-computed search results for re-computation within the re-computation cycle by:
  continuing to select another portion of the pre-computed search results for re-computation and re-assess the amount of computation resources $c_i$ needed to re-compute each pre-computed search result i until 100% of the computation platform's overall computation resources available for re-computation within the re-computation cycle is being used to re-compute each selected portion of the pre-computed search results.

15. The apparatus of claim 9 wherein the program code is further configured to cause the apparatus to:
  generate re-computation orders for the number of pre-computed search results;
  transmit the re-computation orders from a re-computation controller to a computation platform; and
  in response to the re-computation orders, re-compute the pre-computed search results indicated by the re-computation orders.

16. The apparatus of claim 9 wherein the re-computation indicator is further based on an initial accuracy value indicating an expected accuracy of each the pre-computed search result at the time of re-computation.

17. A computer program product for refreshing a cache of pre-computed search results in a database, the computer program product comprising:
  a non-transitory computer readable storage medium; and
  program code stored on the non-transitory computer readable storage medium and configured, upon execution, to cause at least one processor to:
  associate a re-computation indicator with each pre-computed search result i in the database;
  assign a first value to the re-computation indicator of each pre-computed search result i in the database, the first value being based at least partially on a product of a probability $P_{invalid}(i)$ that the respective pre-computed search result i is invalid, an amount of time $t_i$ since the respective pre-computed search result i was last computed, and an amount of computation resources $c_i$ needed to re-compute the respective pre-computed search result i;
  re-compute a number of the pre-computed search results in order of the first value of each respective re-computation indicator, starting with the re-computation indicator having the value that is highest; and
  updating the number of the pre-computed search results in the cache using the re-computed search results,
  wherein re-computing each pre-computed search result i includes performing one or more sub-tasks, and the amount of computation resources $c_i$ needed to re-compute each respective pre-computed search result i is determined by:
    initializing the amount of computation resources $c_i$ needed to re-compute each pre-computed search result i at a second value that assumes each sub-task performed to re-compute the pre-computed search result i will be performed independently from the re-computation of all other pre-computed search results selected for re-computation during the re-computation cycle,
    selecting a portion of the pre-computed search results for re-computation in accordance with the re-computation indicators based on the second values for the computation resources c, needed to re-compute the portion of the pre-computed search results so that re-computing the selected portion of the pre-computed search results would use a given percentage of the computation platform's overall computation resources available for re-computation within the re-computation cycle, and
    re-assessing the amount of computation resources $c_i$ needed to re-compute each pre-computed search result i based on an actual percentage of the computation platform's overall computation resources that would be used for the previous re-computation taking into account the sub-tasks that would be executed commonly for the other pre-computed search results of the portion of pre-computed search results, and wherein the number of the pre-computed search results that is re-computed is based on an amount of computation resources of a computation platform available for the re-computation within a re-computation cycle.

18. The computer program product of claim 17 wherein the first value of the re-computation indicator is defined by $P_{invalid}(i)t_i/c_i$.

19. The computer program product of claim 17 wherein the amount of computation resources $c_i$ needed to re-compute each pre-computed search result i depends on whether or not other pre-computed search results related to the pre-computed search result i are re-computed during the re-computation cycle, and the amount of computation resources $c_i$ needed to re-compute each pre-computed search result i is dynamically estimated depending on which other pre-computed search results related to the pre-computed search result i are selected for re-computation during the re-computation cycle.

20. The computer program product of claim 17 wherein the program code is further configured to cause the at least one processor to determine the amount of computation resources $c_i$ needed to re-compute each respective pre-computed search result i by iteratively selecting the pre-computed search results for re-computation within the re-computation cycle by:

continuing to select another portion of the pre-computed search results for re-computation and re-assess the amount of computation resources $c_i$ needed to re-compute each pre-computed search result i until 100% of the computation platform's overall computation resources available for re-computation within the re-computation cycle is being used to re-compute each selected portion of the pre-computed search results.

* * * * *

UNITED STATES PATENT AND TRADEMARK OFFICE
CERTIFICATE OF CORRECTION

PATENT NO.         : 9,582,536 B2
APPLICATION NO.    : 14/183911
DATED              : February 28, 2017
INVENTOR(S)        : Guillaume Legrand Page 1 of 1

It is certified that error appears in the above-identified patent and that said Letters Patent is hereby corrected as shown below:

In the Claims

At Column 25, Claim number 1, Line number 29, change "c" to --ci--
At Column 26, Claim number 5, Line number 13, change "Δ" to --λ--
At Column 26, Claim number 7, Line number 20, change "c;" to --ci--
At Column 26, Claim number 8, Line number 30, change "c," to --ci--
At Column 27, Claim number 9, Line number 16, change "c," to --ci--
At Column 28, Claim number 17, Line number 56, change "c," to --ci--

Signed and Sealed this
Eleventh Day of April, 2017

Michelle K. Lee
*Director of the United States Patent and Trademark Office*